US011849449B2

(12) United States Patent
Liu et al.

(10) Patent No.: US 11,849,449 B2
(45) Date of Patent: Dec. 19, 2023

(54) BASE STATION APPARATUS, TERMINAL APPARATUS, COMMUNICATION METHOD, AND INTEGRATED CIRCUIT

(71) Applicant: Sharp Kabushiki Kaisha, Sakai (JP)

(72) Inventors: Liqing Liu, Sakai (JP); Shohei Yamada, Sakai (JP); Masayuki Hoshino, Sakai (JP); Hiroki Takahashi, Sakai (JP); Hidekazu Tsuboi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 156 days.

(21) Appl. No.: 17/606,091

(22) PCT Filed: Apr. 22, 2020

(86) PCT No.: PCT/JP2020/017361
§ 371 (c)(1),
(2) Date: Oct. 25, 2021

(87) PCT Pub. No.: WO2020/218355
PCT Pub. Date: Oct. 29, 2020

(65) Prior Publication Data
US 2022/0201725 A1 Jun. 23, 2022

(30) Foreign Application Priority Data
Apr. 26, 2019 (JP) .................... 2019-085641

(51) Int. Cl.
*H04L 1/1812* (2023.01)
*H04W 72/1273* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ......... H04W 72/1273; H04W 72/0446; H04W 72/0453; H04W 72/23; H04L 1/1812;
(Continued)

(56) References Cited

U.S. PATENT DOCUMENTS

2019/0103946 A1* 4/2019 Li .................... H04L 1/1887
2019/0132093 A1   5/2019 Aiba et al.
(Continued)

FOREIGN PATENT DOCUMENTS

WO   2017/187810 A1   11/2017
WO   2018/230999 A1   12/2018

OTHER PUBLICATIONS

Zte, "UL control enhancements for NR URLLC", 3GPP TSG RAN WG1 #96bis, R1-1904144, Apr. 8-12, 2019, pp. 1-8.
(Continued)

*Primary Examiner* — Hanh N Nguyen
(74) *Attorney, Agent, or Firm* — Keating & Bennett, LLP

(57) ABSTRACT

A terminal apparatus receives a higher layer parameter and a PDSCH, and generates a HARQ-ACK codebook and transmits the generated HARQ-ACK codebook on a PUCCH. In a case that a first parameter is configured, a first HARQ-ACK codebook and a second HARQ-ACK codebook are generated, the first HARQ-ACK codebook is used to transmit a HARQ-ACK bit corresponding to a PDSCH A, and the second HARQ-ACK codebook is used to transmit a HARQ-ACK bit corresponding to a PDSCH B. In a case that the first parameter is not configured, the first HARQ-ACK codebook is generated, and the first HARQ-ACK codebook is used to transmit the HARQ-ACK bit corresponding to the PDSCH B.

9 Claims, 18 Drawing Sheets

(51) Int. Cl.
*H04L 5/00* (2006.01)
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(58) Field of Classification Search
CPC ... H04L 5/0053; H04L 1/1671; H04L 1/1822; H04L 1/1896; H04L 27/2601; H04L 5/001; H04L 5/0048; H04L 5/0051; H04L 5/0055; H04L 1/0671
See application file for complete search history.

(56) References Cited

U.S. PATENT DOCUMENTS

| | | |
|---|---|---|
| 2019/0150181 A1 | 5/2019 | Kim et al. |
| 2021/0014026 A1* | 1/2021 | Papasakellariou .... H04L 1/1861 |
| 2022/0077969 A1* | 3/2022 | Kim ...................... H04B 7/0456 |
| 2022/0416956 A1* | 12/2022 | Li .......................... H04L 1/1864 |

OTHER PUBLICATIONS

NTT Docomo, Inc., "UCI enhancements for URLLC", 3GPP TSG RAN WG1 #96bis, R1-1904958, Apr. 8-12, 2019, pp. 1-12.
Nokia et al., "On UCI Enhancements for NR URLLC", 3GPP TSG RAN WG1#96bis, R1-1904828, Apr. 8-12, 2019, 11 pages.
Official Communication issued in International Patent Application No. PCT/JP2020/017361, dated Jun. 16, 2020.
NTT Docomo, "Revision of SI: Study on New Radio Access Technology", RP-161214, 3GPP TSG RAN Meeting #72, Jun. 13-16, 2016, 8 pages.
Samsung, "Introduction of Ultra Reliable Low Latency Communications Enhancements", 3GPP TSG-RAN WG1 Meeting #99, R1-1913197, Nov. 18-22, 2019, 41 pages.
Panasonic, "Discussion on UCI and PUCCH enhancement for URLLC", 3GPP TSG RAN WG1 Ad-Hoc Meeting 1901, R1-1900400, Jan. 21-25, 2019, pp. 1-8.

* cited by examiner

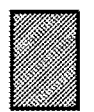 PDSCH
(A) PDSCH mapping type A
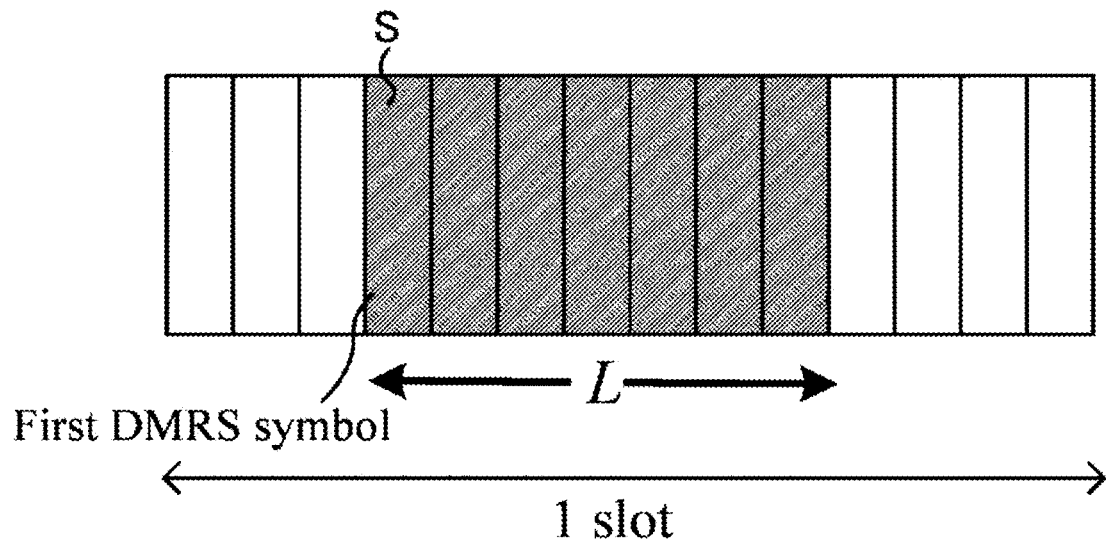
(B) PDSCH mapping type B
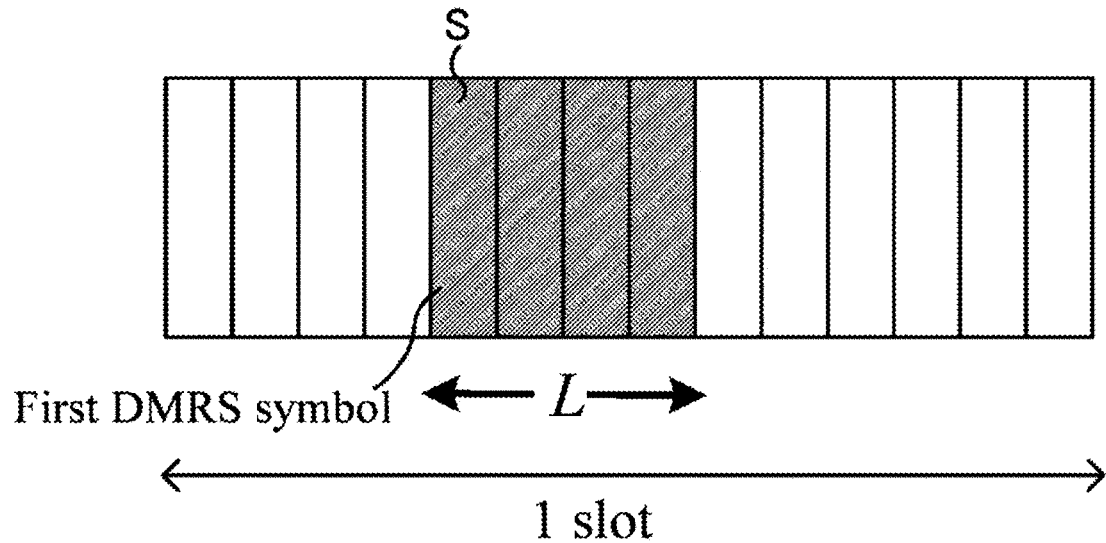
FIG. 7

Applicable PDSCH time domain resource allocation

| RNTI | PDCCH search space | SS/PBCH block and CORESET multiplexing pattern | *pdsch-ConfigCommon* includes *pdsch-TimeDomainAllocationList* | *pdsch-Config* includes *pdsch-TimeDomainAllocationList* | PDSCH time domain resource allocation to apply |
|---|---|---|---|---|---|
| SI-RNTI | Type0 common | 1 | - | - | Default A for normal CP |
| | | 2 | - | - | Default B |
| | | 3 | - | - | Default C |
| SI-RNTI | Type0A common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| RA-RNTI, TC-RNTI | Type1 common | 1, 2, 3 | No | - | Default A |
| | | 1, 2, 3 | Yes | - | *pdsch-TimeDomainAllocationList* provided in *pdsch-ConfigCommon* |
| P-RNTI | Type2 common | 1 | No | - | Default A |
| | | 2 | No | - | Default B |
| | | 3 | No | - | Default C |
| | | 1,2,3 | Yes | - | *pdsch-TimeDomainAllocationList* provided in *pdsch-ConfigCommon* |
| C-RNTI, MCS-C-RNTI, CS-RNTI | Any common search space associated with CORESET#0 | 1, 2, 3 | No | - | Default A |
| | | 1, 2, 3 | Yes | - | *pdsch-TimeDomainAllocationList* provided in *pdsch-ConfigCommon* |
| C-RNTI, MCS-C-RNTI, CS-RNTI | Any common search space not associated with CORESET#0, UE specific search space | 1,2,3 | No | No | Default A |
| | | 1,2,3 | Yes | No | *pdsch-TimeDomainAllocationList* provided in *pdsch-ConfigCommon* |
| | | 1,2,3 | No/Yes | Yes | *pdsch-TimeDomainAllocationList* provided in *pdsch-Config* |

FIG. 10

| DCI | PDCCH search space | pdsch-ConfigCommon includes pdsch-TimeDomainAllocationList | pdsch-Config includes pdsch-TimeDomainAllocationList | pdsch-ConfigCommon includes pdsch-TimeDomainAllocationList2 | pdsch-Config includes pdsch-TimeDomainAllocationList2 | PDSCH time domain resource allocation to apply |
|---|---|---|---|---|---|---|
| DCI A | Any common search space not associated with CORESET#0, | No | No | Yes/No | Yes/No | Default A |
|  |  | Yes | No | Yes/No | Yes/No | pdsch-TimeDomain AllocationList provided in pdsch-ConfigCommon |
|  | UE specific search space | Yes/No | Yes | Yes/No | Yes/No | pdsch-TimeDomain AllocationList provided in pdsch-Config |
| DCI B | Any common search space not associated with CORESET#0, | Yes/No | Yes/No | No | No | Default D |
|  |  | Yes/No | Yes/No | Yes | No | pdsch-TimeDomain AllocationList2 provided in pdsch-ConfigCommon |
|  | UE specific search space | Yes/No | Yes/No | Yes/No | Yes | pdsch-TimeDomain AllocationList2 provided in pdsch-Config |

FIG. 11

| DCI | PDCCH search space | pdsch-ConfigCommon includes pdsch-TimeDomainAllocationList | pdsch-Config includes pdsch-TimeDomainAllocationList | pdsch-Config includes pdsch-TimeDomainAllocationList2 | PDSCH time domain resource allocation to apply |
|---|---|---|---|---|---|
| DCI A | Any common search space not associated with CORESET#0, UE specific search space | No | No | Yes/No | Default A |
| | | Yes | No | Yes/No | pdsch-TimeDomainAllocationList provided in pdsch-ConfigCommon |
| | | Yes/No | Yes | Yes/No | pdsch-TimeDomainAllocationList provided in pdsch-Config |
| DCI B | Any common search space not associated with CORESET#0, UE specific search space | No | Yes/No | No | Default A |
| | | Yes | Yes/No | No | pdsch-TimeDomainAllocationList provided in pdsch-ConfigCommon |
| | | Yes/No | Yes/No | Yes | pdsch-TimeDomainAllocationList2 provided in pdsch-Config |

FIG. 12

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 13

Default PDSCH time domain resource allocation B

| Row index | dmrs-TypeA-Position | PDSCH mapping type | $K_0$ | $S$ | $L$ |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | 2,3 | Type B | 1 | 2 | 2 |
| 7 | 2,3 | Type B | 1 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2,3 | Type B | 0 | 2 | 7 |
| 14 | 2 | Type A | 0 | 2 | 12 |
| 15 | 3 | Type A | 0 | 3 | 11 |
| 15 | 2,3 | Type B | 1 | 2 | 4 |
| 16 | Reserved | | | | |

FIG. 14

Default PDSCH time domain resource allocation C

| Row index | dmrs-TypeA-Position | PDSCH mapping type | $K_0$ | $S$ | $L$ |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | | | Reserved | | |
| 7 | | | Reserved | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 | 2,3 | Type B | 0 | 2 | 7 |
| 14 | 2 | Type A | 0 | 2 | 12 |
| | 3 | Type A | 0 | 3 | 11 |
| 15 | 2,3 | Type A | 0 | 0 | 6 |
| 16 | 2,3 | Type A | 0 | 2 | 6 |

FIG. 15

The starting symbol $S$ relative to the start of the slot, and the number of consecutive symbols $L$ counting from the symbol $S$ allocated for the PDSCH are determined from the start and length indicator $SLIV$:

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$

FIG. 16

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority to JP 2019-085641 filed on Apr. 26, 2019, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by The Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of the present invention is to provide a terminal apparatus, a base station apparatus, a communication method, and an integrated circuit that enable efficient communication in a radio communication system as that described above.

Solution to Problem (1) In order to accomplish the object described above, aspects of the present invention are contrived to provide the following means. Specifically, a terminal apparatus according to an aspect of the present invention includes: a receiver configured to receive a PDSCH; and a transmitter configured to generate a HARQ-ACK codebook used to transmit a HARQ-ACK information bit in response to the PDSCH, and transmit the generated HARQ-ACK codebook on a PUCCH, wherein in a case that a first RRC parameter is provided, one or two of the HARQ-ACK codebooks are generated, and in a first case that the two HARQ-ACK codebooks are generated, a first HARQ-ACK codebook and a second HARQ-ACK codebook are generated, and in a second case that the first RRC parameter is not provided, one HARQ-ACK codebook is generated.

(2) A base station apparatus for communicating with a terminal apparatus according to an aspect of the present invention includes: a transmitter configured to transmit a PDSCH; and a receiver configured to receive, on a PUCCH, a HARQ-ACK codebook generated to transmit a HARQ-ACK information bit in response to the PDSCH in the terminal apparatus, wherein in a case that a first RRC parameter is provided for the terminal apparatus, one or two of the HARQ-ACK codebooks are generated, and in a first case that the two HARQ-ACK codebooks are generated, a first HARQ-ACK codebook and a second HARQ-ACK codebook are generated, and in a second case that the first RRC parameter is not provided for the terminal apparatus, one HARQ-ACK codebook is generated.

(3) A communication method according to an aspect of the present invention is a communication method for a terminal apparatus, including: receiving a PDSCH; and generating a HARQ-ACK codebook used to transmit a HARQ-ACK information bit in response to the PDSCH, and transmitting the generated HARQ-ACK codebook on a PUCCH, wherein in a case that a first RRC parameter is provided, one or two of the HARQ-ACK codebooks are generated, and in a first case that the two HARQ-ACK codebooks are generated, a first HARQ-ACK codebook and a second HARQ-ACK codebook are generated, and in a second case that the first RRC parameter is not provided, one HARQ-ACK codebook is generated.

(4) A communication method according to an aspect of the present invention is a communication method for a base station apparatus for communicating with a terminal apparatus, including: transmitting a PDSCH; and receiving, on a PUCCH, a HARQ-ACK codebook generated to transmit a HARQ-ACK information bit in response to the PDSCH in the terminal apparatus, wherein in a case that a first RRC parameter is provided for the terminal apparatus, one or two of the HARQ-ACK codebooks are generated, and in a first case that the two HARQ-ACK codebooks are generated, a first HARQ-ACK codebook and a second HARQ-ACK codebook are generated, and in a second case that the first RRC parameter is not provided for the terminal apparatus, one HARQ-ACK codebook is generated.

Advantageous Effects of Invention

According to an aspect of the present invention, a base station apparatus and a terminal apparatus can efficiently communicate with each other.

BRIEF DESCRIPTION OF DRAWINGS

FIG. 7 is a diagram illustrating an example of a PDSCH mapping type according to an embodiment of the present invention.

FIG. 10 is a diagram illustrating definition of which resource allocation table is applied to PDSCH time domain resource allocation according to an embodiment of the present invention.

FIG. 11 is an example of a table indicating a method for determining a resource allocation table to be applied to a PDSCH according to an embodiment of the present invention.

FIG. 12 is another example of the table indicating the method for determining the resource allocation table to be applied to the PDSCH according to an embodiment of the present invention.

FIG. 13 is a diagram illustrating an example of a default table A according to an embodiment of the present invention.

FIG. 14 is a diagram illustrating an example of a default table B according to an embodiment of the present invention.

FIG. 15 is a diagram illustrating an example of a default table C according to an embodiment of the present invention.

FIG. 16 is a diagram illustrating an example in which SLIV is calculated according to an embodiment of the present invention.

DESCRIPTION OF EMBODIMENTS

An embodiment of the present invention will be described below.

Figure 1:
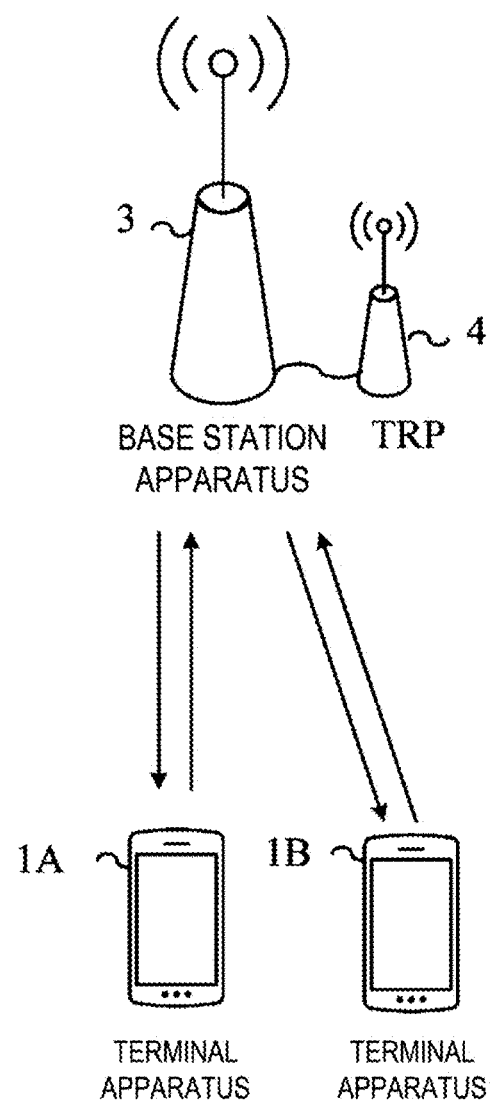
FIG. 1 is a diagram illustrating a concept of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1 below.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or multiple transmission reception points 4. At least some of the functions/processing of the base station apparatus 3 described below may be the functions/processing of each of the transmission reception points 4 included in the base station apparatus 3. The base station apparatus 3 may use a communicable range (communication area) controlled by the base station apparatus 3, as one or multiple cells to serve the terminal apparatus 1. Furthermore, the base station apparatus 3 may use a communicable range (communication area) controlled by one or multiple transmission reception points 4, as one or multiple cells to serve the terminal apparatus 1. Additionally, the base station apparatus 3 may divide one cell into multiple beamed areas and serve the terminal apparatus 1 in each of the beamed areas. Here, a beamed area may be identified based on a beam index used for beamforming or a precoding index.

A radio communication link from the base station apparatus 3 to the terminal apparatus 1 is referred to as a downlink. A radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP need not be used, or the above-described transmission scheme with zero padding may be used instead of the CP. Moreover, the CP or zero passing may be added both forward and backward.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, the Special Cell (SpCell) is referred to as a PCell of the MCG or a PSCell of the SCG, respectively, depending on whether a Medium Access Control (MAC) entity is associated with the MCG or the SCG. In a case that the operation is not in dual connectivity, the Special Cell (SpCell) is referred to as a PCell. The Special Cell (SpCell) supports PUCCH transmission and contention based random access.

In the present embodiment, one or multiple serving cells may be configured for the terminal apparatus 1. The multiple serving cells configured may include one primary cell and one or multiple secondary cells. The primary cell may be a serving cell on which an initial connection establishment procedure has been performed, a serving cell in which a connection re-establishment procedure has been initiated, or a cell indicated as a primary cell in a handover procedure. One or multiple secondary cells may be configured at a point of time in a case that or after a Radio Resource Control (RRC) connection is established. Note that the multiple serving cells configured may include one primary secondary cell. The primary secondary cell may be a secondary cell that is included in the one or multiple secondary cells configured and in which the terminal apparatus 1 can transmit control information in the uplink. Additionally, subsets of two types of serving cells corresponding to a master cell group and a secondary cell group may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be referred to as an unpaired spectrum operation. The FDD scheme may be referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast time indexes within the period of synchronization signal blocks (also referred to as SS/PBCH blocks). Here, the time index is information indicating the indexes of the synchronization signals and the PBCHs within the cell. For example, in a case that the SS/PBCH block is transmitted using the assumption of three transmit beams (transmission filter configuration and Quasi Co-Location (QCL) related to reception spatial parameters), the order of time within a prescribed period or within a configured period may be indicated. Additionally, the terminal apparatus may recognize the difference in time index as a difference in transmit beam.

The PDCCH is used to transmit (or carry) downlink control information (DCI) in a case of downlink radio communication (radio communication from the base station apparatus 3 to the terminal apparatus 1). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus 1 monitors a set of PDCCH candidates in the serving cell. The monitoring means an attempt to decode the PDCCH in accordance with a certain DCI format.

For example, the following DCI format may be defined.
DCI format 0_0
DCI format 0_1
DCI format 0_2
DCI format 1_0
DCI format 1_1
DCI format 1_2
DCI format 2_0
DCI format 2_1
DCI format 2_2
DCI format 2_3

DCI format 0_0 may be used for scheduling of the PUSCH in a certain serving cell. DCI format 0_0 may include information indicating PUSCH scheduling information (frequency domain resource allocation and time domain resource allocation). A Cyclic Redundancy Check (CRC) may be added to DCI format 0_0, the CRC being scrambled with, among Radio Network Temporary Identifiers (RNTIs) being identifiers, any one of a Cell-RNTI (C-RNTI), a Configured Scheduling (CS)-RNTI), an MCS-C-RNTI, and/or a Temporary C-NRTI (TC-RNTI). DCI format 0_0 may be monitored in a common search space or a UE-specific search space.

DCI format 0_1 may be used for scheduling of the PUSCH in a certain serving cell. DCI format 0_1 may include information indicating PUSCH scheduling information (frequency domain resource allocation and time domain resource allocation), information indicating a BandWidth Part (BWP), a Channel State Information (CSI) request, a Sounding Reference Signal (SRS) request, and/or information related to antenna ports. A CRC scrambled with any one of RNTIs including the C-RNTI, the CS-RNTI, a Semi Persistent (SP)-CSI-RNTI, and/or the MCS-C-RNTI may be added to DCI format 0_1. DCI format 0_1 may be monitored in the UE-specific search space.

DCI format 0_2 may be used for scheduling of the PUSCH in a certain serving cell. DCI format 0_2 may include information indicating PUSCH scheduling information (frequency domain resource allocation and time domain resource allocation), information indicating the BWP, a CSI request, an SRS request, and/or information related to the antenna ports. A CRC scrambled with any one of RNTIs including the C-RNTI, the CSI-RNTI, the SP-CSI-RNTI, and/or the MCS-C-RNTI may be added to DCI format 0_2. DCI format 0_2 may be monitored in the UE-specific search space. DCI format 0_2 may be referred to as a DCI format 0_1A or the like.

DCI format 1_0 may be used for scheduling of the PDSCH in a certain serving cell. DCI format 1_0 may include information indicating PDSCH scheduling information (frequency domain resource allocation and time domain resource allocation). A CRC scrambled with any one of identifiers including the C-RNTI, the CS-RNTI, the MCS-C-RNTI, a Paging RNTI (P-RNTI), a System Information (SI)-RNTI, a Random Access (RA)-RNTI, and/or a TC-RNTI may be added to DCI format 1_0. DCI format 1_0 may be monitored in the common search space or the UE-specific search space.

DCI format 1_1 may be used for scheduling of the PDSCH in a certain serving cell. DCI format 1_1 may include information indicating PDSCH scheduling information (frequency domain resource allocation and time domain resource allocation), information indicating the bandwidth part (BWP), Transmission Configuration Indication (TCI), and/or information related to the antenna ports. A CRC scrambled with any one of RNTIs including the C-RNTI, the CS-RNTI, and/or the MCS-C-RNTI may be added to DCI format 1_1. DCI format 1_1 may be monitored in the UE-specific search space.

DCI format 1_2 may be used for scheduling of the PDSCH in a certain serving cell. DCI format 1_2 may include information indicating PDSCH scheduling information (frequency domain resource allocation and time domain resource allocation), information indicating the BWP, TCI, and/or information related to the antenna ports. A CRC scrambled with, among the RNTIs, any one of the C-RNTI, the CS-RNTI, and/or the MCS-C-RNTI may be added to DCI format 1_2. DCI format 1_2 may be monitored in the UE-specific search space. DCI format 1_2 may be referred to as DCI format 1_1A or the like. DCI format 1_2 may be DCI format 1_1 to which a CRC scrambled with a UC-RNTI is added. However, the UC-RNTI may be an RNTI with a value different from the values available for the C-RNTI, the MCS-C-RNTI, the CS-RNTI, the SI-RNTI, the RA-RNTI, the TC-RNTI, and the P-RNTI. However, the UC-RNTI may be an RNTI used to control the PDSCH or PUSCH for data for a prescribed service in one or multiple slots.

DCI format 2_0 is used to notify the slot format of one or multiple slots. The slot format is defined as a format in which each OFDM symbol in the slot is classified as downlink, flexible, or uplink. For example, in a case that the slot format is 28, DDDDDDDDDDDDFU is applied to the 14 OFDM symbols in the slot for which slot format 28 is indicated. Here, D is a downlink symbol, F is a flexible symbol, and U is an uplink symbol. Note that the slot will be described below.

DCI format 2_1 is used to notify the terminal apparatus 1 of physical resource blocks and OFDM symbols which may be assumed to involve no transmission. Note that this information may be referred to as a pre-emption indication (intermittent transmission indication).

DCI format 2_2 is used for transmission of the PUSCH and a Transmit Power Control (TPC) command for the PUSCH.

DCI format 2_3 is used to transmit a group of TPC commands for transmission of sounding reference signals (SRSs) by one or multiple terminal apparatuses 1. Additionally, the SRS request may be transmitted along with the TPC command. In addition, the SRS request and the TPC command may be defined in the DCI format 2_3 for uplink with no PUSCH and PUCCH or uplink in which the transmit power control for the SRS is not associated with the transmit power control for the PUSCH.

Here, the DCI for the downlink is also referred to as downlink grant or downlink assignment. Here, the DCI for the uplink is also referred to as uplink grant or uplink assignment. The DCI may also be referred to as a DCI format.

CRC parity bits added to the DCI format transmitted on one PDCCH are scrambled with the SI-RNTI, the P-RNTI, the C-RNTI, the CS-RNTI, the RA-RNTI, or the TC-RNTI. The SI-RNTI may be an identifier used for broadcasting of the system information. The P-RNTI may be an identifier used for paging and notification of system information modification. The C-RNTI, the MCS-C-RNTI, and the CS-RNTI are identifiers for identifying a terminal apparatus within a cell. The TC-RNTI is an identifier for identifying the terminal apparatus 1 that has transmitted a random access preamble during a contention based random access procedure.

The C-RNTI is used to control the PDSCH or the PUSCH in one or multiple slots. The CS-RNTI is used to periodically allocate a resource for the PDSCH or the PUSCH. The MCS-C-RNTI is used to indicate the use of a prescribed MCS table for grant-based transmission. The TC-RNTI is used to control PDSCH transmission or PUSCH transmission in one or multiple slots. The TC-RNTI is used to schedule re-transmission of a random access message 3 and transmission of a random access message 4. The RA-RNTI is determined in accordance with frequency and time location information regarding the physical random access channel on which the random access preamble has been transmitted.

For the C-RNTI and/or the other RNTIs, different values corresponding to the type of traffic on the PDSCH or the PUSCH may be used. For the C-RNTI and the other RNTIs, different values corresponding to the service type (eMBB, URLLC, and/or mMTC) of the data transmitted on the PDSCH or PUSCH may be used. The base station apparatus 3 may use the RNTI having a different value corresponding to the service type of the data transmitted. The terminal apparatus 1 may identify the service type of the data transmitted on the associated PDSCH or PUSCH, based on the value of the RNTI applied to the received DCI (used for the scrambling).

The PUCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)). The HARQ-ACK is also referred to as an ACK/NACK, HARQ feedback, HARQ-ACK feedback, a HARQ response, HARQ-ACK bits, HARQ-ACK information bits, a HARQ-ACK response, HARQ information, HARQ-ACK information, HARQ control information, and HARQ-ACK control information. In a case that downlink data is successfully decoded, an ACK for the downlink data is generated. In a case that downlink data is not successfully decoded, a NACK for the downlink data is generated. Discontinuous Transmission (DTX) may mean that the downlink data has not been detected. The discontinuous Transmission (DTX) may mean that data for which a HARQ-ACK response is to be transmitted has not been detected. The HARQ-ACK may include a HARQ-ACK for a Code Block Group (CBG). The HARQ-ACK for some or all of the CBGs included in a transport block may be transmitted on a PUCCH or PUSCH.

The PDSCH is used to transmit downlink data (Downlink Shared CHannel (DL-SCH)) from a Medium Access Control (MAC) layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. Additionally, the RRC layer of the terminal apparatus 1 acquires system information broadcast from the base station apparatus 3. In this regard, the RRC signaling, the system information, and/or the MAC control element is also referred to as higher layer signaling or a higher layer parameter. The higher layer as used herein means a higher layer as viewed from the physical layer, and thus may include one or multiple of the MAC layer, the RRC layer, an RLC layer, a PDCP layer, a Non Access Stratum (NAS) layer, and the like. For example, in the processing of the MAC layer, the higher layer may include one or multiple of the RRC layer, the RLC layer, the PDCP layer, the NAS layer, and the like. Hereinafter, "A is given in the higher layer" or "A is given by the higher layer" may mean that the higher layer (mainly the RRC layer, the MAC layer, or the like) of the terminal apparatus 1 receives A from the base station apparatus 3 and that A received is provided from the higher layer of the terminal apparatus 1 to the physical layer of the terminal apparatus 1. Configuring a higher layer parameter for the terminal apparatus 1 may mean that the higher layer parameter is provided to the terminal apparatus.

The PDSCH or the PUSCH may be used to transmit the RRC signaling and the MAC control element. In this regard, in the PDSCH, the RRC signaling transmitted from the base station apparatus 3 may be signaling common to multiple terminal apparatuses 1 in a cell. The RRC signaling transmitted from the base station apparatus 3 may be dedicated signaling for a certain terminal apparatus 1 (also referred to as dedicated signaling). In other words, terminal apparatus-specific (UE-specific) information may be transmitted through dedicated signaling to the certain terminal apparatus 1. Additionally, the PUSCH may be used to transmit UE capabilities in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration, or a spatial domain transmission filter or a spatial domain reception filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phase Tracking Reference Signal (PTRS)
Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and a transmission method for a periodic, semi-persistent, or aperiodic CSI reference signal is applied to the CSI-RS. For the CSI-RS, a Non-Zero Power (NZP) CSI-RS and a CSI-RS with zero transmit power (or receive power) (Zero Power (ZP)) may be defined. Here, the ZP CSI-RS may be defined as a CSI-RS resource that has zero transmit power or that is not transmitted. The PTRS is used to track phase on the time axis to ensure frequency offset caused by phase noise. The TRS is used to ensure Doppler shift during fast movement. Note that the TRS may be used as one configuration of the CSI-RS. For example, a radio resource may be configured with the CSI-RS for one port as a TRS.

According to the present embodiment, one or multiple of the following uplink reference signals are used.

Demodulation Reference Signal (DMRS)
Phase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management. The PTRS is used to track phase on the time axis to ensure frequency offset caused by phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
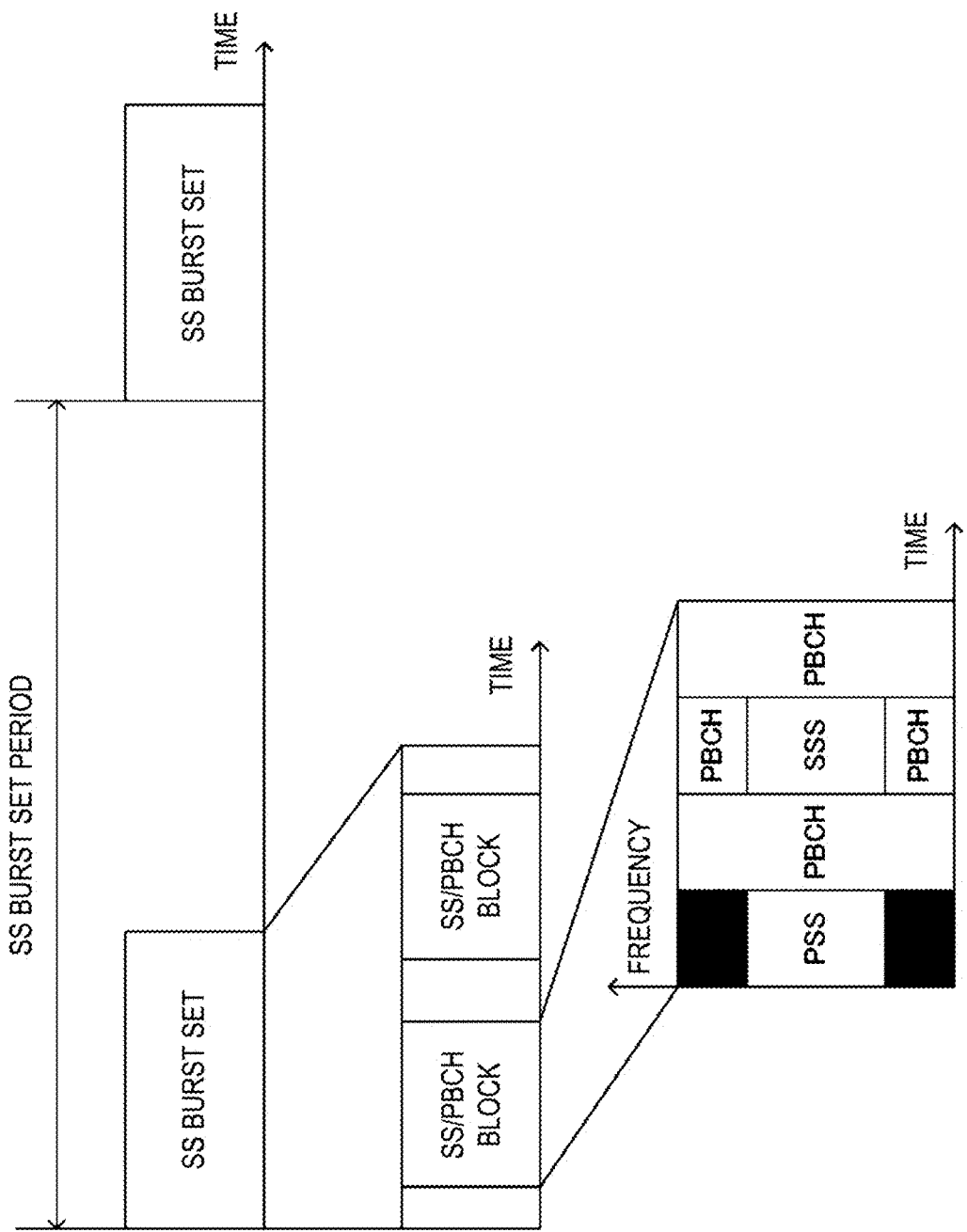
FIG. 2 is a diagram illustrating an example of an SS/PBCH block and an SS burst set according to an embodiment of the present invention.

FIG. 2 is a diagram illustrating an example of SS/PBCH blocks (also referred to as synchronization signal blocks, SS blocks, and SSBs) and SS burst sets (also referred to as synchronization signal burst sets) according to the present embodiment. FIG. 2 illustrates an example in which two SS/PBCH blocks are included in a periodically transmitted SS burst set, and the SS/PBCH block includes continuous four OFDM symbols.

The SS/PBCH block is a unit block including at least synchronization signals (PSS, SSS) and/or PBCHs. Transmitting the signals/channels included in the SS/PBCH block is described as transmitting the SS/PBCH block. In a case of transmitting the synchronization signals and/or the PBCHs using one or multiple SS/PBCH blocks in the SS burst set, the base station apparatus 3 may use an independent downlink transmit beam for each SS/PBCH block.

In FIG. 2, PSS, SSS, and PBCHs are time/frequency multiplexed in one SS/PBCH block. However, the order in which the PSS, the SSS, and/or the PBCHs are multiplexed in the time domain may be different from the order in the example illustrated in FIG. 2.

The SS burst set may be transmitted periodically. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

The SS burst set may be determined based on a System Frame Number (SFN). Additionally, a start position of the SS burst set (boundary) may be determined based on the SFN and the period.

The SS/PBCH block is assigned with an SSB index (which may be referred to as the SSB/PBCH block index) depending on the temporal position in the SS burst set. The terminal apparatus 1 calculates the SSB index, based on the information of the PBCH and/or the information of the reference signal included in the detected SS/PBCH block.

The SS/PBCH blocks with the same relative time in each SS burst set in the multiple SS burst sets are assigned with the same SSB index. The SS/PBCH blocks with the same relative time in each SS burst set in the multiple SS burst sets may be assumed to be QCLed (or the same downlink transmit beam may be assumed to be applied to these SS/PBCH blocks). In addition, antenna ports in the SS/PBCH blocks with the same relative time in each SS burst set in the multiple SS burst sets may be assumed to be QCLed for average delay, Doppler shift, and spatial correlation.

Within a certain SS burst set period, the SS/PBCH block assigned with the same SSB index may be assumed to be QCLed for average delay, average gain, Doppler spread, Doppler shift, and spatial correlation. A configuration corresponding to one or multiple SS/PBCH blocks (or the SS/PBCH blocks may be reference signals) that are QCLed may be referred to as a QCL configuration.

The number of SS/PBCH blocks (which may be referred to as the number of SS blocks or the SSB number) may be defined as, for example, the number of SS/PBCH blocks within an SS burst, an SS burst set, or an SS/PBCH block period. Additionally, the number of SS/PBCH blocks may indicate the number of beam groups for cell selection within the SS burst, the SS burst set, or the SS/PBCH block period. Here, the beam group may be defined as the number of different SS/PBCH blocks or the number of different beams included in the SS burst, the SS burst set, or the SS/PBCH block period.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as a reference signal. The reference signals used in the downlink include a downlink reference signal, a synchronization signal, an SS/PBCH block, a downlink DM-RS, a CSI-RS, and the like. The reference signals used in the uplink include an uplink reference signal, an SRS and/or an uplink DM-RS, and the like.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the procedures described below may be included as a procedure for configuring, setting, or establishing a beam pair link.

Beam selection

Beam refinement

Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and beam refinement. Note that the beam recovery may include the following procedures.

Detection of beam failure

Discovery of a new beam

Transmission of a beam recovery request

Monitoring of a response to the beam recovery request

For example, the Reference Signal Received Power (RSRP) of the SSS included in the CSI-RS or the SS/PBCH block may be used or a CSI may be used in selecting the transmit beam of the base station apparatus 3 at the terminal apparatus 1. Additionally, as a report to the base station apparatus 3, the CSI-RS Resource Index (CRI) may be used, or an index indicated in the PBCHs included in the SS/PBCH block and/or in a sequence of demodulation reference signals (DMRSs) used for demodulation of the PBCHs may be used.

Additionally, the base station apparatus 3 indicates the CRI or the time index of the SS/PBCH in indicating the beam to the terminal apparatus 1, and the terminal apparatus 1 receives the beam, based on the CRI or the time index of the SS/PBCH that is indicated. At this time, the terminal apparatus 1 may configure a spatial filter, based on the CRI or the time index of the SS/PBCH that is indicated, and receive the beam. Additionally, the terminal apparatus 1 may receive the beam by using the assumption of Quasi Co-Location (QCL). One signal (such as an antenna port, a synchronization signal, a reference signal, etc.) being "QCLed" with another signal (such as an antenna port, a synchronization signal, a reference signal, etc.) or "using the assumption of QCL" for these signals can be interpreted as the one signal being associated with the other signal.

In a case that a long term property of a channel on which one symbol in one antenna port is carried may be estimated from a channel on which one symbol in the other antenna port is carried, the two antenna ports are said to be quasi co-located. The long term property of the channel includes at least one of a delay spread, a Doppler spread, a Doppler shift, an average gain, or an average delay. For example, in a case that an antenna port 1 and an antenna port 2 are quasi co-located with respect to the average delay, this means that a reception timing for the antenna port 2 may be estimated from a reception timing for the antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSD), or Spatial Correlation, or a reception spatial parameter in a radio link or channel.

For example, in a case that the antenna port 1 and the antenna port 2 may be considered to be QCLed with respect to a reception spatial parameter, this means that a reception beam (reception spatial filter) in which a signal from the antenna port 2 is received may be inferred from a reception beam in which a signal from the antenna port 1 is received.

As QCL types, combinations of long term properties that may be considered to be QCLed may be defined. For example, the following types may be defined.

Type A: Doppler shift, Doppler spread, average delay, delay spread
Type B: Doppler shift, Doppler spread
Type C: Average delay, Doppler shift
Type D: Reception spatial parameter The above-described QCL types may configure and/or indicate the assumption of QCL of the one or two reference signals and the PDCCH or the PDSCH DMRS in the RRC and/or MAC layer and/or DCI as a Transmission Configuration Indication (TCI). For example, in a case that the index #2 of the SS/PBCH block and the QCL type A+QCL type B are configured and/or indicated as one state of the TCI in a case that the terminal apparatus 1 receives the PDCCH, then at the time of reception of the PDCCH DMRS, the terminal apparatus 1 may receive the PDCCH DMRS and perform synchronization and channel estimation, with the Doppler shift, Doppler spread, average delay, delay spread, and reception spatial parameter in the reception of SS/PBCH block index #2 considered as the long term properties of the channels. At this time, the reference signal (in the example described above, the SS/PBCH block) indicated by the TCI may be referred to as a source reference signal, and the reference signal (in the above-described example, the PDCCH DMRS) affected by the long term property inferred from the long term property of the channel in a case that the source reference signal is received may be referred to as a target reference signal. Additionally, for the TCI, the RRC configures one or multiple TCI states and a combination of the source reference signal and the QCL type for each state, and the TCI may be indicated to the terminal apparatus 1 by using the MAC layer or DCI.

According to this method, operations of the base station apparatus 3 and the terminal apparatus 1 equivalent to beam management may be defined based on the QCL assumption for the spatial domain and radio resources (time and/or frequency) as beam management and beam indication/report.

The subframe will now be described. The subframe in the present embodiment may also be referred to as a resource unit, a radio frame, a time period, or a time interval.

Figure 3:
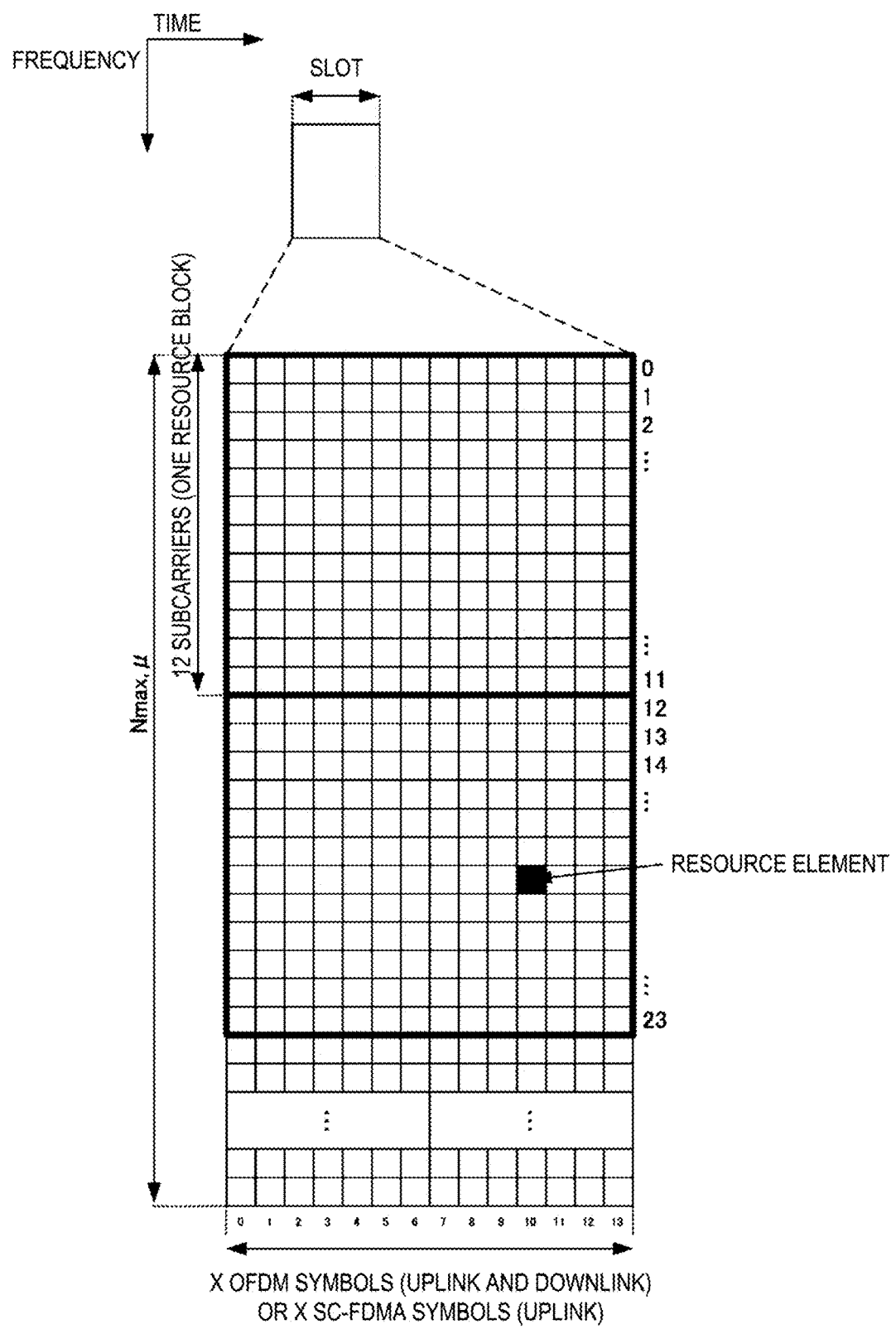
FIG. 3 is a diagram illustrating a schematic configuration of an uplink slot and a downlink slot according to an embodiment of the present invention.

FIG. 3 is a diagram illustrating a general configuration of an uplink and a downlink slots according to a first embodiment of the present invention. Each of the radio frames is 10 ms in length. Additionally, each of the radio frames includes 10 subframes and W slots. In addition, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. Additionally, for example, for X=14, W=10 in a case that the subcarrier spacing is 15 kHz, and W=40 in a case that the subcarrier spacing is 60 kHz. FIG. 3 illustrates a case of X=7 as an example. Note that a case of X=14 can be similarly configured by expanding the case of X=7. Furthermore, the uplink slot is defined similarly, and the downlink slot and the uplink slot may be defined separately. Additionally, the bandwidth of the cell of FIG. 3 may also be defined as a part of the band (BandWidth Part (BWP)). In addition, the slot may be referred to as a Transmission Time Interval (TTI). The slot need not be defined as a TTI. The TTI may be a transmission period for transport blocks.

The signal or the physical channel transmitted in each of the slots may be represented by a resource grid. The resource grid is defined by multiple subcarriers and multiple OFDM symbols for each numerology (subcarrier spacing and cyclic prefix length) and for each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, for a subcarrier spacing of 15 kHz, in a case that the number X of OFDM symbols included in a subframe is 14 and NCPs are used, one physical resource block is defined by 14 continuous OFDM symbols in the time domain and by 12*Nmax continuous subcarriers in the frequency domain. Nmax is the maximum number of resource blocks determined by a subcarrier spacing configuration μ described below. In other words, the resource grid includes (14*12*Nmax, μ) resource elements. Extended CPs (ECPs) are supported only at a subcarrier spacing of 60 kHz, and thus one physical resource block is defined by 12 (the number of OFDM symbols included in one slot)*4 (the number of slots included in one subframe) in the time domain=48 continuous OFDM symbols, 12*Nmax, μ continuous subcarriers in the frequency domain, for example. In other words, the resource grid includes (48*12*Nmax, μ) resource elements.

As resource blocks, a reference resource block, a common resource block, a physical resource block, and a virtual resource block are defined. One resource block is defined as 12 subcarriers that are continuous in the frequency domain. Reference resource blocks are common to all subcarriers, and for example, resource blocks may be configured at a subcarrier spacing of 15 kHz and may be numbered in ascending order. Subcarrier index 0 at reference resource block index 0 may be referred to as reference point A (point A) (which may simply be referred to as a "reference point"). The common resource blocks are resource blocks numbered in ascending order from 0 at each subcarrier spacing configuration μ starting at the reference point A. The resource grid described above is defined by the common resource blocks. The physical resource blocks are resource blocks numbered in ascending order from 0 included in a bandwidth part (BWP) described below, and the physical resource blocks are resource blocks numbered in ascending order from 0 included in the bandwidth part (BWP). A certain physical uplink channel is first mapped to a virtual resource block. Thereafter, the virtual resource block is mapped to a physical resource block. Hereinafter, the resource block may be a virtual resource block, a physical resource block, a common resource block, or a reference resource block.

Now, the subcarrier spacing configuration μ will be described. As described above, one or multiple OFDM numerologies are supported in NR. In a certain BWP, the subcarrier spacing configuration μ (μ=0, 1, . . . , 5) and the cyclic prefix length are given for a downlink BWP by a higher layer and for an uplink BWP by a higher layer. In this regard, given μ, a subcarrier spacing Δf is given by Δf=2^μ*15 (kHz).

At the subcarrier spacing configuration μ, the slots are counted in ascending order from 0 to N^{subframe, μ}_{slot}−1 within the subframe, and counted in ascending order from 0 to N^{frame, μ}_{slot}−1 within the frame. N^{slot}_{symb} continuous OFDM symbols are in the slot, based on the slot configuration and the cyclic prefix. N^{slot}_{symb} is 14. The start of the slot n^{μ}_{s} within the subframe is temporally aligned with the start of the n^{μ}_{s}*N^{slot}_{symb}th OFDM symbol within the same subframe.

Figure 4:
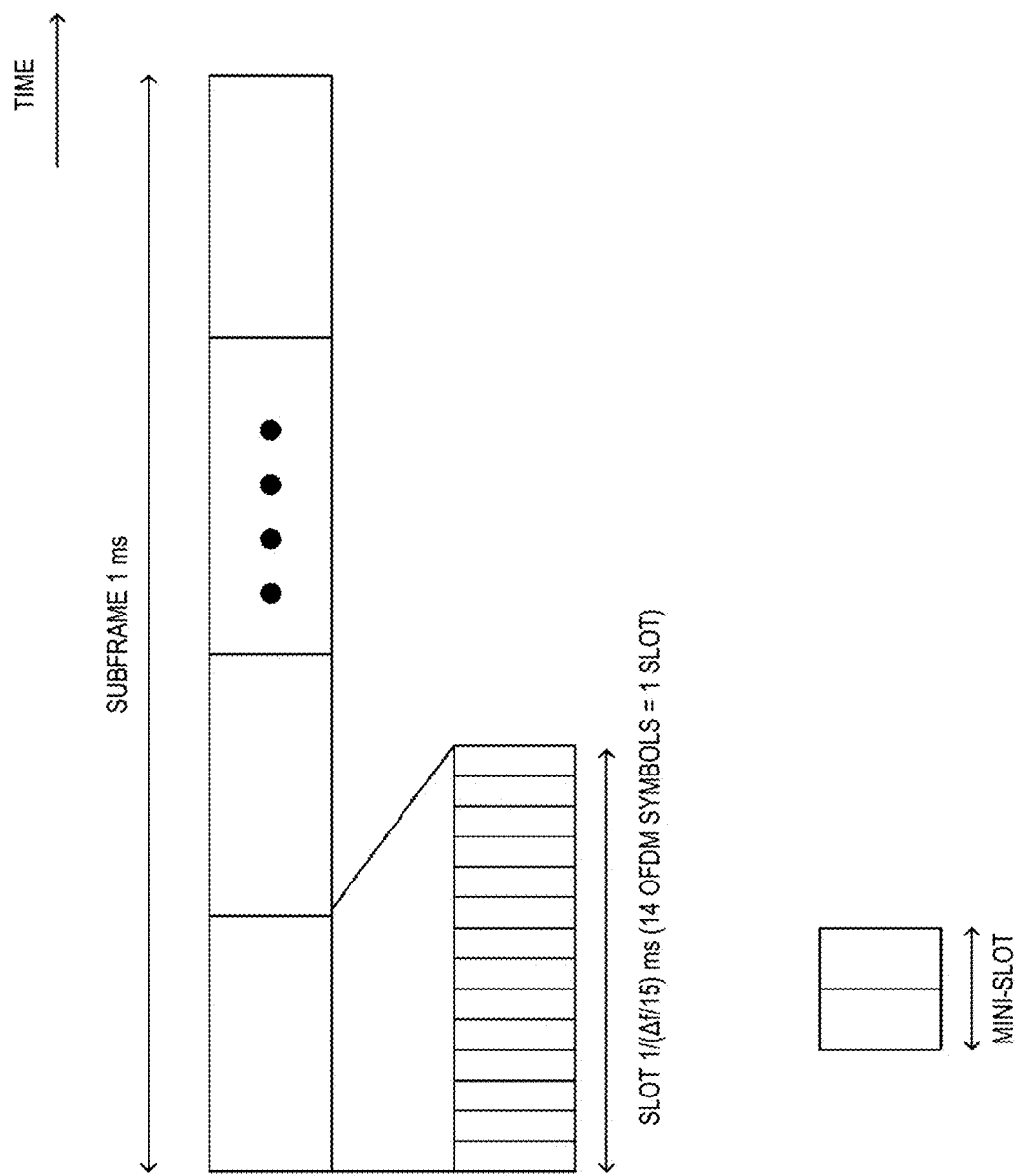
FIG. 4 is a diagram illustrating a relationship of a subframe, a slot, and a mini-slot in a time domain according to an embodiment of the present invention.

The subframe, the slot, and a mini-slot will now be described. FIG. 4 is a diagram illustrating the relationship of a subframe, slots, and mini-slots in the time domain. As illustrated in FIG. 4, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as PDSCH mapping type A. The uplink slot may be referred to as PUSCH mapping type A.

The mini-slot (which may be referred to as a subslot) is a time unit including OFDM symbols that are less in number than the OFDM symbols included in one slot. FIG. 4 illustrates, by way of example, a case in which the mini-slot includes 2 OFDM symbols. The OFDM symbols in the mini-slot may match the timing for the OFDM symbols constituting the slot. Note that the minimum unit of scheduling may be a slot or a mini-slot. Additionally, allocation of mini-slots may be referred to as non-slot based scheduling.

Mini-slots being scheduled may also be expressed as resources being scheduled for which the relative time positions of the start positions of the reference signal and the data are fixed. The downlink mini-slot may be referred to as PDSCH mapping type B. The uplink mini-slot may be referred to as PUSCH mapping type B.

The uplink mini-slot may be referred to as a PUCCH sub-slot. One uplink slot may include one or multiple PUCCH sub-slots. The number of transmissions of the PUCCH started in one PUCCH sub-slot may be one regarding the PUCCH used at least for HARQ-ACK transmission. The unit constituting a HARQ-ACK codebook may be the PUCCH sub-slot. The number of symbols (length) of the PUCCH sub-slot and/or the number of PUCCH sub-slots in the uplink may be given for each terminal by the higher layer. In the present embodiment, transmission of a first HARQ-ACK codebook may be performed in the uplink slot (PUCCH slot). Transmission of a second HARQ-ACK codebook may be performed in the PUCCH sub-slot.

Figure 5:
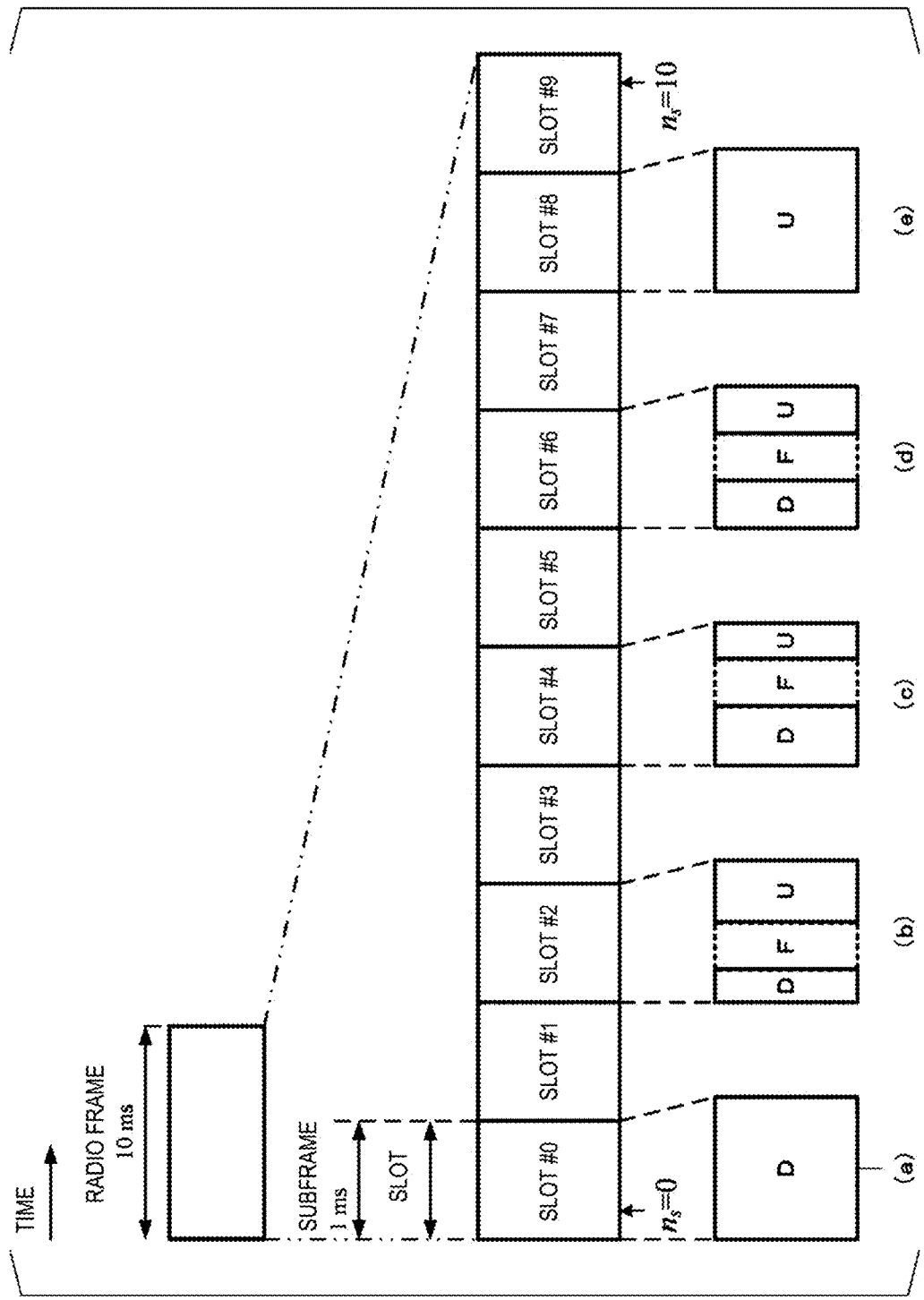
FIG. 5 is a diagram illustrating an example of a slot or a subframe according to an embodiment of the present invention.

FIG. 5 is a diagram illustrating an example of a slot format. In this regard, a case in which the slot length is 1 ms at a subcarrier spacing of 15 kHz is illustrated as an example. In FIG. 5, D represents the downlink, and U represents the uplink. As illustrated in FIG. 5, during a certain time period (for example, the minimum time period to be allocated to one UE in the system), one or multiple of the following types of symbols may be included:

downlink symbols,
flexible symbols, and
uplink symbols.

Note that the ratio of these symbols may be preset as a slot format. Additionally, the definition may be made based on the number of downlink OFDM symbols included in the slot, and the start position and end position of the symbols within the slot. Additionally, the definition may be made based on the number of uplink OFDM symbols or DFT-S-OFDM symbols included in the slot or the start position and end position of the symbols within the slot. Note that the slot being scheduled may be expressed as resources being scheduled for which the relative time positions of the reference signal and the slot boundary are fixed.

The terminal apparatus 1 may receive a downlink signal or a downlink channel in the downlink symbols or the flexible symbols. The terminal apparatus 1 may transmit an uplink signal or a downlink channel in the uplink symbols or the flexible symbols.

FIG. 5(a) illustrates an example of a certain time period (which may be referred to as, for example, a minimum unit of time resource that can be allocated to one UE, a time unit, or the like, additionally, a set of multiple minimum units of time resources may be referred to as a time unit) in which all of the slot is used for downlink transmission, and in FIG. 5(b), the slot is used such that in the first time resource, for example, the uplink is scheduled via the PDCCH and that after a flexible symbol including a processing delay of the PDCCH, a time for switching from downlink to uplink, and generation of a transmit signal, an uplink signal is transmitted. In FIG. 5(c), the slot is used such that in the first time resource, the PDCCH and/or the downlink PDSCH is transmitted and that after a gap for a processing delay, a time for switching from downlink to uplink, and generation of a transmit signal, the PUSCH or PUCCH is transmitted. Here, for example, the uplink signal may be used to transmit the HARQ-ACK and/or CSI, namely, the UCI. In FIG. 5(d), the slot is used such that in the first time resource, the PDCCH and/or the PDSCH is transmitted and that after a gap for a processing delay, a time for switching from downlink to uplink, and generation of a transmit signal, the uplink PUSCH and/or PUCCH is transmitted. Here, for example, the uplink signal may be used to transmit the uplink data, namely, the UL-SCH. In FIG. 5(e), the entire slot is used for uplink transmission (PUSCH or PUCCH).

The above-described downlink part and uplink part may include multiple OFDM symbols as is the case with LTE.

Figure 6:
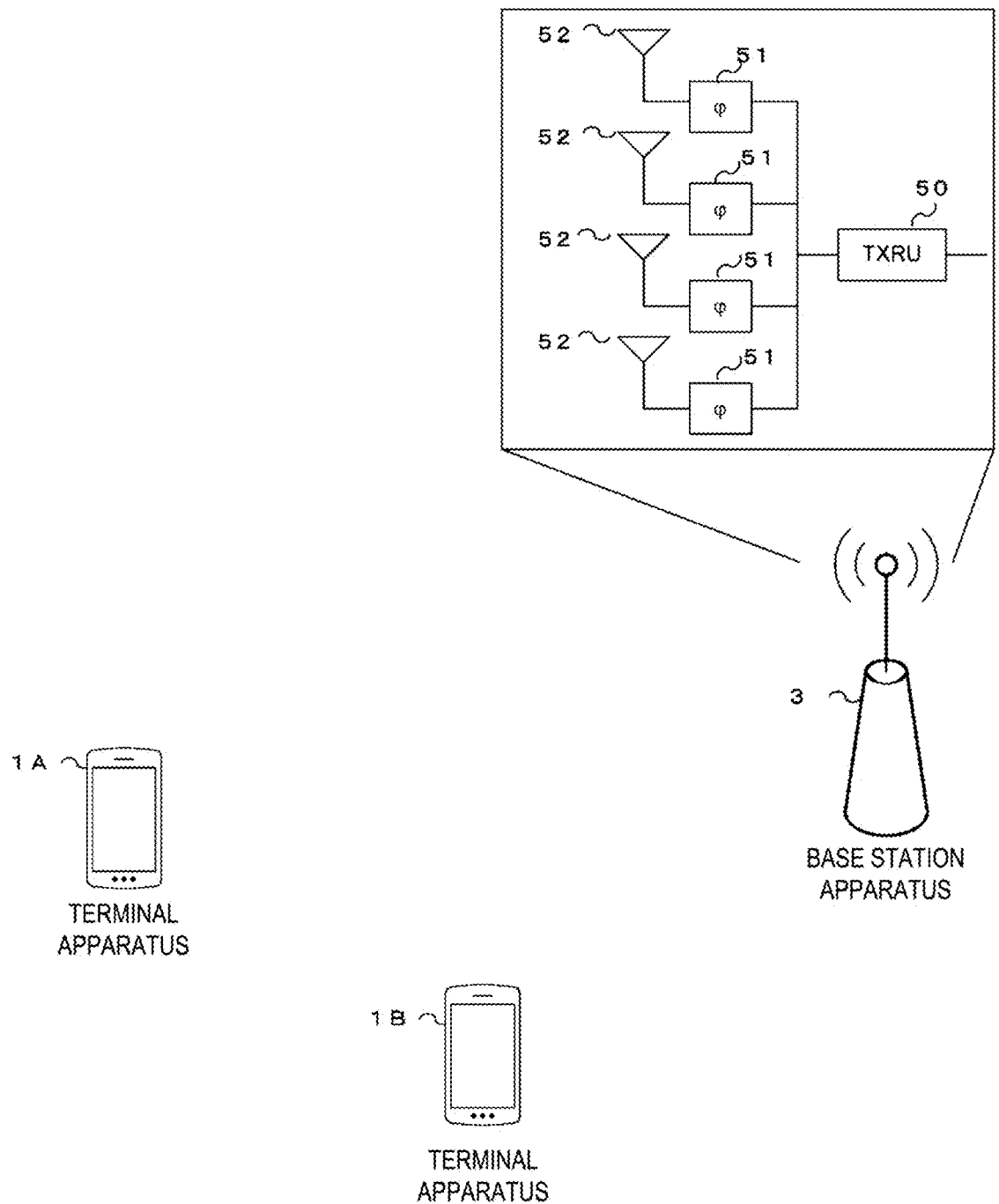
FIG. 6 is a diagram illustrating an example of beamforming according to an embodiment of the present invention.

FIG. 6 is a diagram illustrating an example of beamforming. Multiple antenna elements are connected to one Transmission unit (Transceiver unit (TXRU)) 50. The phase is controlled by using a phase shifter 51 for each antenna element and a transmission is performed from an antenna element 52, thus allowing a beam for a transmit signal to be directed in any direction. Typically, the TXRU may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

Hereinafter, the bandwidth part (BWP) will be described. The BWP is also referred to as a carrier BWP. The BWP may be configured for each of the downlink and the uplink. The BWP is defined as a set of continuous physical resources selected from continuous subsets of common resource blocks. The terminal apparatus 1 can be configured with up to four BWPs such that one downlink carrier BWP (DL BWP) is activated at a certain time. The terminal apparatus 1 can be configured with up to four BWPs such that one uplink carrier BWP (UL BWP) is activated at a certain time. In a case of carrier aggregation, the BWP may be configured in each serving cell. At this time, one BWP being configured in a certain serving cell may be expressed as no BWP being configured. Two or more BWPs being configured may also be expressed as the BWP being configured.

MAC Entity Operation

An activated serving cell always includes one active (activated) BWP. BWP switching for a certain serving cell is used to activate an inactive (deactivated) BWP and to deactivate an active (activated) BWP. BWP switching for a certain serving cell is controlled by the PDCCH indicating downlink allocation or uplink grant. BWP switching for a certain serving cell may be further controlled by a BWP inactivity timer or RRC signaling, or by the MAC entity itself at the initiation of a random access procedure. In the addition of the SpCell (PCell or PSCell) or the activation of the SCell, one of the BWPs is a first active BWP without reception of the PDCCH indicating downlink allocation or uplink grant. A first active DL BWP and a first active UL BWP may be designated in an RRC message sent from the base station apparatus 3 to the terminal apparatus 1. The active BWP for a certain serving cell is designated in the RRC or PDCCH sent from the base station apparatus 3 to the terminal apparatus 1. Additionally, the first active DL BWP and the first active UL BWP may be included in the message 4. In an unpaired spectrum (TDD bands or the like), the DL BWP and the UL BWP are paired, and the BWP switching is common to the UL and DL. In the active BWP for each of the activated serving cells for which the BWP is configured, the MAC entity of the terminal apparatus 1 applies normal processing. The normal processing includes transmitting a UL-SCH, transmitting an RACH, monitoring the PDCCH, transmitting the PUCCH, transmitting the SRS, and receiving the DL-SCH. In the inactive BWP for each of the activated serving cells for which the BWP is configured, the MAC entity of the terminal apparatus 1 does not transmit the UL-SCH, does not transmit the RACH, does not monitor the PDCCH, does not transmit the PUCCH, does not transmit the SRS, and does not receive the DL-SCH. In a case that a certain serving cell is deactivated, the active BWP may be configured to be absent (e.g., the active BWP is deactivated).

RRC Operation

BWP information elements (IEs) included in the RRC message (broadcast system information or information sent in a dedicated RRC message) is used to configure the BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one uplink BWP (such as a case that the serving cell is configured with the uplink) or two uplink BWPs (such as a case that a supplementary uplink is used). Furthermore, the network may configure an additional uplink BWP or downlink BWP for a certain serving cell. The BWP configuration is divided into uplink parameters and downlink parameters. Additionally, the BWP configuration is also divided into common parameters and dedicated parameters. The common parameters (such as a BWP uplink common IE and a BWP downlink common IE) are cell specific. The common parameters for the initial BWP of the primary cell are also provided by using system information. For all the other serving cells, the network provides the common parameters through dedicated signals. The BWP is identified by a BWP ID. For the initial BWP, the BWP ID is 0. For each of the other BWPs, the BWP ID takes a value ranging from 1 to 4.

In a case that the higher layer parameter initialDownlinkBWP is not configured (provided) for the terminal apparatus 1, an initial DL BWP (initial active DL BWP) may be defined by the position and number of continuous PRBs, the subcarrier spacing, and the cyclic prefix for PDCCH reception in a control resource set (CORESET) for a Type0-PDCCH common search space. The position of each of the continuous PRBs corresponds to the PRBs in the control resource set for the Type0-PDCCH common search space, and starts with the PRB with the smallest index and ends with the PRB with the largest index. In a case that the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in the SIB1 (systemInformationBlockType1, ServingCellConfigCommonSIB) or ServingCellConfigCommon. The information element ServingCellConfigCommonSIB is used to configure a cell-specific parameter for the serving cell for the terminal apparatus 1 in SIB1.

In other words, in a case that the higher layer parameter initialDownlinkBWP is not configured (provided) for the terminal apparatus 1, the size of the initial DL BWP may correspond to the number of resource blocks in the control resource set (CORESET #0) for the Type0-PDCCH common search space. In a case that the higher layer parameter initialDownlinkBWP is configured (provided) for the terminal apparatus 1, the size of the initial DL BWP may be given by locationAndBandwidth included in the higher layer parameter initialDownlinkBWP. The higher layer parameter locationAndBandwidth may indicate the location and bandwidth of the frequency domain of the initial DL BWP.

As described above, multiple DL BWPs may be configured for the terminal apparatus 1. In the DL BWPs configured for the terminal apparatus 1, a default DL BWP can be configured by a higher layer parameter defaultDownlinkBWP-Id. In a case that the higher layer parameter defaultDownlinkBWP-Id is not provided for the terminal apparatus 1, the default DL BWP is the initial DL BWP.

The terminal apparatus 1 may be provided with an initial UL BWP by SIB1 (systemInformationBlockType1) or initialUplinkBWP. The information element initialUplinkBWP is used to configure the initial UL BWP. For an operation on the SpCell or the secondary cell, the initial UL BWP (initial active UL BWP) may be configured (provided) for the terminal apparatus 1 by the higher layer parameter initialUplinkBWP. In a case that a supplementary uplink carrier (supplementary UL carrier) is configured for the terminal apparatus 1, the initial UL BWP in the supplementary uplink carrier may be configured for the terminal apparatus 1 by initialUplinkBWP included in the higher layer parameter supplementaryUplink.

The control resource set (CORESET) in the present embodiment will be described below.

The control resource set (CORESET) includes time and frequency resources for a search for downlink control information. The configuration information of the CORESET includes the identifier of the CORESET (ControlResourceSetId, CORESET-ID) and information identifying the frequency resource for the CORESET. The information element ControlResourceSetId (the identifier of the CORESET) is used to identify the control resource set in a certain serving cell. The identifier of the CORESET is used among the BWPs in a certain serving cell. The identifier of CORESET is unique among the BWPs in the serving cell. The number of CORESETs in each BWP is limited to three, including the initial CORESET. In a certain serving cell, the value of the identifier of each CORESET takes a value ranging from 0 to 11.

The control resource set identified by the identifier 0 (ControlResourceSetId 0) of the CORESET is referred to as CORESET #0. CORESET #0 may be configured by pdcch-ConfigSIB1 included in the MIB or PDCCH-ConfigCommon included in ServingCellConfigCommon. In other words, the configuration information of CORESET #0 may be pdcch-ConfigSIB1 included in the MIB or PDCCH-ConfigCommon included in ServingCellConfigCommon. The configuration information of CORESET #0 may be configured by controlResourceSetZero included in the PDCCH-ConfigSIB1 or PDCCH-ConfigCommon. In other words, the information element controlResourceSetZero is used to indicate CORESET #0 (common CORESET) of the initial DL BWP. The CORESET denoted by pdcch-ConfigSIB1 is CORESET #0. The information element pdcch-ConfigSIB1 in the MIB or the dedicated configuration is used to configure the initial DL BWP. CORESET configuration information pdcch-ConfigSIB1 for CORESET #0 does not include information explicitly identifying the identifier of the CORESET and the frequency resource (e.g., the number of continuous resource blocks) and the time resource (the number of continuous symbols) for the CORESET, but the frequency resource (e.g., the number of continuous resource blocks) and time resource (the number of continuous symbols) for the CORESET for CORESET #0 can be implicitly identified by information included in pdcch-ConfigSIB1. The information element PDCCH-ConfigCommon is used to configure a cell-specific PDCCH parameter provided by using the SIB. Additionally, PDCCH-ConfigCommon may also be provided in a case that handover and the PSCell and/or the SCell are added. The configuration information of CORESET #0 is included in the configuration of the initial BWP. That is, the configuration information of CORESET #0 need not be included in the configuration of the BWP other than the initial BWP.

controlResourceSetZero corresponds to four bits in pdcch-ConfigSIB1 (e.g., four MSB bits, four most significant bits). CORESET #0 is a control resource set for Type0-PDCCH common search space.

The configuration information of the additional common control resource (additional common CORESET) set may be configured by commonControlResourceSet included in PDCCH-ConfigCommon. Additionally, the configuration information of the additional common CORESET may also be used to specify additional common CORESET for system information and/or a paging procedure. The configuration information of the additional common CORESET may be used to specify an additional common CORESET used in a random access procedure. The configuration information of the additional common CORESET may be included in the configuration of each BWP. The identifier of the CORESET indicated in commonControlResourceSet takes a value other than 0.

The common CORESET may be a CORESET used in the random access procedure (e.g., an additional common CORESET). Additionally, in the present embodiment, the common CORESET may include CORESET #0 and/or the CORESET configured by the configuration information of the additional common CORESET. In other words, the common CORESET may include CORESET #0 and/or the additional common CORESET. CORESET #0 may be referred to as common CORESET #0. Also in the BWP other than the BWP for which the common CORESET is configured, the terminal apparatus 1 may reference (acquire) the configuration information of the common CORESET.

The configuration information of the one or multiple CORESETs may be configured by PDCCH-Config. The information element PDCCH-Config is used to configure UE-specific PDCCH parameters (e.g., CORSET, a search space, etc.) for a certain BWP. PDCCH-Config may be included in the configuration of each BWP.

In other words, in the present embodiment, the configuration information of the common CORESET indicated by the MIB is pdcch-ConfigSIB1, and the configuration information of the common CORESET indicated by PDCCH-ConfigCommon is controlResourceSetZero, and the configuration information of the common CORESET (additional common CORESET) indicated by PDCCH-ConfigCommon is commonControlResourceSet. Additionally, the configuration information of one or multiple CORESETs (UE specifically configured Control Resource Sets, UE-specific CORESETs) indicated by PDCCH-Config is controlResourceSetToAddModList.

The search space is defined to search for PDCCH candidates. searchSpaceType included in the search space configuration information indicates whether the search space is a Common Search Space (CSS) or a UE-specific Search Space (USS). The UE-specific search space is derived at least from the value of the C-RNTI set by the terminal apparatus 1. In other words, the UE-specific search space is derived separately for each terminal apparatus 1. The common search space is a search space common to the multiple terminal apparatuses 1, and includes a Control Channel Element (CCE) with a prescribed index. The CCE includes multiple resource elements. The configuration information of the search space includes information regarding a DCI format monitored in the search space.

The configuration information of the search space includes the identifier of the CORESET identified by the configuration information of the CORESET. The CORESET identified by the identifier of the CORESET included in the configuration information of the search space is associated with the search space. In other words, the CORESET associated with the search space is the CORESET identified by the identifier of the CORESET included in the search space. The DCI format indicated by the configuration information of the search space is monitored by the associated CORESET. Each search space is associated with a single CORESET. For example, the configuration information of the search space for the random access procedure may be configured by ra-SearchSpace. In other words, the CORESET associated with ra-SearchSpace is used to monitor the DCI format provided with a CRC scrambled with the RA-RNTI or TC-RNTI is added.

The terminal apparatus 1 monitors the set of candidates for the PDCCH in one or multiple CORESETs allocated in each active serving cell configured to monitor the PDCCH. The set of candidates for the PDCCH corresponds to one or multiple search space sets. Monitoring means decoding of candidates for each PDCCH in accordance with one or multiple DCI formats to be monitored. The set of candidates for the PDCCH monitored by the terminal apparatus 1 is defined by the PDCCH search space sets. One search space set is a common search space set or a UE-specific search space set. In the above, the search space set is referred to as a search space, the common search space set is referred to as a common search space, and the UE-specific search space set is referred to as a UE-specific search space. The terminal apparatus 1 monitors the PDCCH candidates by using one or multiple search space sets described below.—Type0-PDCCH common search space set (Type0 common search space): the search space set is configured by a search space SIB1 (searchSpaceSIB1) indicated by pdcch-ConfigSIB1 or PDCCH-ConfigCommon indicated by the MIB, or searchSpaceZero included in PDCCH-ConfigCommon, searchSpaceSIB1 and searchSpaceZero corresponding to higher layer parameters. The search space is for monitoring of the DCI format with the CRC scrambled with SI-RNRI in the primary cell.—Type0A-PDCCH common search space set (Type0A common search space): the search space set is configured by a search space (searchSpaceOtherSystemInformation) corresponding to a higher layer parameter and indicated by PDCCH-ConfigCommon. The search space is for monitoring of the DCI format with the CRC scrambled with SI-RNRI in the primary cell.—Type1-PDCCH common search space set (Type1 common search space): the search space set is configured by a search space for a random access procedure (ra-SearchSpace) corresponding to a higher layer parameter and indicated by PDCCH-ConfigCommon. The search space is for monitoring of the DCI format with the CRC scrambled with RA-RNRI or TC-RNTI in the primary cell. Type1-PDCCH common search space set is a search space set for the random access procedure.—Type2-PDCCH common search space set (Type2 common search space): the search space set is configured by a search space for the paging procedure (pagingSearchSpace) corresponding to a higher layer parameter and indicated by PDCCH-ConfigCommon. The search space is for monitoring of the DCI format with the CRC scrambled with P-RNTI in the primary cell.—Type3-PDCCH common search space set (Type3 common search space): the search space set is configured by a search space of a common search space type (SearchSpace) corresponding to a higher layer parameter and indicated by PDCCH-Config. The search space is for monitoring of the DCI format with the CRC scrambled with INT-RNTI, SFI-RNTI, TPC-PUSCH-RNTI, TPC-PUCCH-RNTI, or TPC-SRS-RNTI. For the primary cell, the search space is for monitoring of the DCI format with the CRC scrambled with C-RNTI, CS-RNTI(s), or MCS-C-RNTI.—UE-specific search space set: the search space set is configured by a search space of a UE-specific search space type (SearchSpace) corresponding to a higher layer parameter and indicated by PDCCH-Config. The search space is for monitoring of the DCI format with the CRC scrambled with C-RNTI, CS-RNTI(s), or MCS-C-RNTI.

In a case that the terminal apparatus 1 is provided with one or multiple search space sets by the corresponding higher layer parameter (searchSpaceZero, searchSpaceSIB1, searchSpaceOtherSystemInformation, pagingSearchSpace, ra-SearchSpace, etc.) and provided with C-RNTI or CS-RNTI, the terminal apparatus 1 may use the one or multiple search space sets to monitor PDCCH candidates for DCI format 0_0 and DCI format 1_0 with the C-RNTI or CS-RNTI.

The configuration information of the BWP is divided into the configuration information of the DL BWP and the configuration information of the UL BWP. The configuration information of the BWP includes an information element bwp-Id (identifier of the BWP). The identifier of the BWP included in the configuration information of the DL BWP is used to identify (reference) the DL BWP in a certain serving cell. The identifier of the BWP included in the configuration information of the UL BWP is used to identify (reference) the UL BWP in a certain serving cell. The identifier of the BWP is assigned to each of the DL BWP and UL BWP. For example, the identifier of the BWP corresponding to the DL BWP may be referred to as a DL BWP index. The identifier of the BWP corresponding to the UL BWP may be referred to as a UL BWP index. The initial DL BWP is referenced by identifier 0 of the DL BWP. The initial UL BWP is referenced by identifier 0 of the UL BWP. Each of the other DL BWPs or the other UL BWPs may be referenced by any of the identifiers of the BWPs ranging from 1 to maxNrofBWPs. In other words, the identifier of the BWP set to 0 (bwp-Id=0) is associated with the initial BWP and prevented from being used for the other BWPs. maxNrofBWPs is the maximum number of BWPs per serving cell and is 4. In other words, each of the identifiers of the other BWPs takes a value ranging from 1 to 4. Other higher layer configuration information is associated with a particular BWP by utilizing the identifier of the BWP. The DL BWP and UL BWP having the same BWP identifier may mean that the DL BWP and UL BWP are paired.

For the terminal apparatus 1, one primary cell and up to 15 secondary cells may be configured.

A procedure for receiving the PDSCH will be described below.

By detecting the PDCCH including DCI format 1_0, DCI format 1_1, or DCI format 1_2, the terminal apparatus 1 may decode (receive) the corresponding PDSCH. The corresponding PDSCH is scheduled (indicated) by the DCI format (DCI). The start position (starting symbol) of the scheduled PDSCH is referred to as S. The starting symbol S of the PDSCH may be the first symbol in which the PDSCH is transmitted (mapped) within a certain slot. The starting symbol S corresponds to the beginning of the slot. For example, in a case that S has a value of 0, the terminal apparatus 1 may receive the PDSCH from the first symbol in the certain slot. Additionally, for example, in a case that S has a value of 2, the terminal apparatus 1 may receive the PDSCH from the third symbol of the certain slot. The number of continuous (Consecutive) symbols of the scheduled PDSCH is referred to as L. The number of continuous symbols L is counted from the starting symbol S. The determination of S and L allocated to the PDSCH will be described later.

The type of PDSCH mapping includes PDSCH mapping type A and PDSCH mapping type B. For the PDSCH mapping type A, S takes a value ranging from 0 to 3. L takes a value ranging from 3 to 14. However, the sum of S and L takes a value ranging from 3 to 14. For the PDSCH mapping type B, S takes a value ranging from 0 to 12. L takes one of the values {2, 4, and 7}. However, the sum of S and L takes a value ranging from 2 to 14.

The position of a DMRS symbol for the PDSCH depends on the type of the PDSCH mapping. The position of the first DMRS symbol (first DM-RS symbol) for the PDSCH depends on the type of the PDSCH mapping. For the PDSCH mapping type A, the position of the first DMRS symbol may be indicated in a higher layer parameter dmrs-TypeA-Position. In other words, the higher layer parameter dmrs-TypeA-Position is used to indicate the position of the first DMRS for the PDSCH or PUSCH. dmrs-TypeA-Position may be set to either 'pos2' or 'pos3'. For example, in a case that dmrs-TypeA-Position is set to 'pos2', the position of the first DMRS symbol for the PDSCH may correspond to the third symbol in the slot. For example, in a case that dmrs-TypeA-Position is set to 'pos3', the position of the first DMRS symbol for the PDSCH may correspond to the fourth symbol in the slot. In this regard, S can take a value of 3 only in a case that dmrs-TypeA-Position is set to 'pos3'. In other words, in a case that dmrs-TypeA-Position is set to 'pos2', then S takes a value ranging from 0 to 2. For the PDSCH mapping type B, the position of the first DMRS symbol corresponds to the first symbol of the allocated PDSCH.

FIG. 7 is a diagram illustrating an example of the PDSCH mapping type according to the present embodiment. FIG. 7(A) is a diagram illustrating an example of PDSCH mapping type A. In FIG. 7(A), S of the allocated PDSCH is 3. L of the allocated PDSCH is 7. In FIG. 7(A), the position of the first DMRS symbol for the PDSCH corresponds to the fourth symbol in the slot. In other words, dmrs-TypeA-Position is set to 'pos3'. FIG. 7(B) is a diagram illustrating an example of PDSCH mapping type A. In FIG. 7(B), S of the allocated PDSCH is 4. L of the allocated PDSCH is 4. In FIG. 7(B), the position of the first DMRS symbol for the PDSCH corresponds to the first symbol to which the PDSCH is allocated.

A method for identifying PDSCH time domain resource allocation will be described below.

The base station apparatus 3 may use the DCI to perform scheduling such that the terminal apparatus 1 receives the PDSCH. The terminal apparatus 1 may receive the PDSCH by detecting the DCI addressed to the terminal apparatus 1. In identifying PDSCH time domain resource allocation, the terminal apparatus 1 first determines a resource allocation table to be applied to the PDSCH. The resource allocation table includes one or multiple PDSCH time domain resource allocation configurations. The terminal apparatus 1 may select one PDSCH time domain resource allocation configuration in the determined resource allocation table, based on a value indicated in a 'Time domain resource assignment' field included in the DCI scheduling the PDSCH. In other words, the base station apparatus 3 determines the PDSCH resource allocation for the terminal apparatus 1, generates a 'Time domain resource assignment' field with a value based on the determined resource allocation, and transmits, to the terminal apparatus 1, the DCI including the 'Time domain resource assignment' field. The terminal apparatus 1 identifies the resource allocation in the time direction for the PDSCH, based on the value in the 'Time domain resource assignment' field.

FIG. 10 is a diagram defining a resource allocation table applied to the PDSCH time domain resource allocation. With reference to FIG. 10, the terminal apparatus 1 may determine a resource allocation table to be applied to the PDSCH time domain resource allocation, based on the table illustrated in FIG. 10. The resource allocation table includes one or multiple PDSCH time domain resource allocation configurations. In the present embodiment, each resource allocation table is classified as one of (I) a predefined resource allocation table and (II) a resource allocation table configured from higher layer RRC signaling. The predefined resource allocation table is defined, for example, as a default PDSCH time domain resource allocation A, a default PDSCH time domain resource allocation B, and a default PDSCH time domain resource allocation C. Additionally, a default PDSCH time domain resource allocation D different from the default PDSCH time domain resource allocation A may be defined. Hereinafter, the default PDSCH time domain resource allocation A is referred to as a default table A, the default PDSCH time domain resource allocation B is referred to as a default table B, the default PDSCH time domain resource allocation C is referred to as a default table C, and the default PDSCH time domain resource allocation D is referred to as a default table D.

FIG. 13 is a diagram illustrating an example of the default table A according to the present embodiment. FIG. 14 is a diagram illustrating an example of the default table B according to the present embodiment. FIG. 15 is a diagram illustrating an example of the default table C according to the present embodiment. In the example in FIG. 13, the number of rows in the default table A is 16, and each row indicates a configuration for the PDSCH time domain resource allocation. In FIG. 13, each of the rows defines the PDSCH mapping type, a slot offset $K_0$ between the PDCCH including the DCI and the corresponding PDSCH, the starting symbol S for the PDSCH within the slot, and the number L of continuous allocated symbols.

The resource allocation table configured by higher layer RRC signaling is given by higher layer signaling pdsch-TimeDomainAllocationList. pdsch-TimeDomainAllocationList includes one or multiple information elements PDSCH-TimeDomainResourceAllocation. PDSCH-TimeDomainResourceAllocation indicates a configuration for the PDSCH time domain resource allocation. PDSCH-TimeDomainResourceAllocation may be used to configure a time domain relationship between the PDCCH including the DCI and the PDSCH. In other words, pdsch-TimeDomainAllocationList is a list including one or multiple information elements. One PDSCH-TimeDomainResourceAllocation may also be referred to as one entry (or one row). For example, pdsch-TimeDomainAllocationList includes up to 16 entries, and any one entry may be used by a 4-bit field included in the DCI. However, the number of entries included in pdsch-TimeDomainAllocationList may be a different number, and the number of bits in a field included in the DCI in connection with pdsch-TimeDomainAllocationList may have a different value. The entries in pdsch-TimeDomainAllocationList may indicate $K_0$, mappingType, and/or startSymbolAndLength. $K_0$ indicates the slot offset between the PDCCH including the DCI and the corresponding PDSCH. In a case that PDSCH-TimeDomainResourceAllocation does not indicate $K_0$, the terminal apparatus 1 may assume that $K_0$ has a prescribed value (for example, 0). mappingType indicates whether the mapping type of the corresponding PDSCH is the PDSCH mapping type A or the PDSCH mapping type B. startSymbolAndLength is an index providing an effective combination of the starting symbol S of the corresponding PDSCH and the number L of continuous allocated symbols. startSymbolAndLength may be referred to as a start and length indicator (SLIV). In a case that the SLIV is applied, then unlike in a case that the default table is used, the corresponding starting symbol S of the corresponding PDSCH and the corresponding number L of continuous symbols may be given based on the SLIV. The base station apparatus 3 may set the SLIV value such that the PDSCH time domain resource allocation does not exceed the slot boundary. The slot offset $K_0$ and the SLIV will be described below.

The higher layer signaling pdsch-TimeDomainAllocationList may be included in a cell-specific RRC parameter pdsch-ConfigCommon and/or a terminal apparatus 1 (UE)-specific RRC parameter pdsch-Config. pdsch-ConfigCommon is used to configure a cell-specific parameter for the PDSCH for a certain BWP. pdsch-Config is used to configure a terminal apparatus 1 (UE) specific parameter for the PDSCH for a certain BWP.

The terminal apparatus 1 may apply different resource allocation tables to the PDSCH time domain resource allocation depending on whether a PDSCH A is received or a PDSCH B is received. The base station apparatus 3 may apply different resource allocation tables to the PDSCH time domain resource allocation depending on whether the PDSCH A is transmitted or the PDSCH B is transmitted.

The PDSCH A and the PDSCH B may be PDSCHs that transmit data for different services. For example, the PDSCH A may be a PDSCH that transmits eMBB data and the PDSCH B may be a PDSCH that transmits URLLC data. The PDSCH A may be a PDSCH scheduled by DCI A. The PDSCH B may be a PDSCH scheduled by DCI B.

The DCI A and the DCI B may be pieces of DCI for scheduling data for different services. For example, the DCI A may be DCI for scheduling the PDSCH transmitting eMBB data, and the DCI B may be DCI for scheduling the PDSCH transmitting URLLC data.

The DCI A and the DCI B may be pieces of DCI to which CRCs scrambled with different RNTIs are added. For example, the DCI A may be DCI to which a CRC scrambled with a C-RNTI corresponding to a first range of values is added, and the DCI B may be DCI to which a CRC scrambled with a C-RNTI corresponding to a second range of values different from the first range of values is added. For example, the DCI A may be DCI to which a CRC scrambled with any type of RNTI corresponding to a third range of values is added, and the DCI B may be DCI to which a CRC scrambled with any type of RNTI corresponding to a fourth range of values different from the third range of values is added. For example, the DCI A may be DCI to which a CRC scrambled with the C-RNTI, the MCS-C-RNTI, the CS-RNTI, the SI-RNTI, the RA-RNTI, the TC-RNTI, and/or the P-RNTI is added, and the DCI B may be DCI to which a CRC scrambled with the UC-RNTI is added.

The DCI A and the DCI B may be pieces of DCI using different DCI formats. For example, the DCI A may be DCI using DCI format 1_0 and/or DCI format 1_1, and the DCI B may be DCI using DCI format 1_2.

The DCI A and the DCI B may be pieces of DCI using DCI formats of different sizes. For example, the DCI A may be DCI using a DCI format of a first size, and the DCI B may be DCI using a DCI format of a second size different from the first size.

The DCI A and the DCI B may indicate, in prescribed fields in the respective DCI formats, services to be applied to data in the corresponding PDSCHs. For example, a field in the DCI format of the DCI A may identify transmission of the eMBB data on the corresponding PDSCH. For example, a field in the DCI format of the DCI B may identify transmission of the URLLC data on the corresponding PDSCH. In other words, the DCI A and the DCI B may be classified based on a prescribed field in a certain DCI format.

The DCI A and the DCI B may be pieces of DCI transmitted in different search spaces and/or different CORESETs. For example, the DCI A may be DCI transmitted in the common search space. The DCI B may be DCI transmitted in the UE-specific search space.

The DCI A and the DCI B may be pieces of DCI for scheduling the PDSCHs with different codebooks. The codebook corresponding to the PDSCH may be indicated by a field (for example, a field of 1 bit) in the DCI format. For example, in a case that the value of the field is set to '0', the codebook corresponding to the scheduled PDSCH (PDSCH A) may be a first codebook. In a case that the value of the field is set to '1', the codebook corresponding to the scheduled PDSCH (PDSCH B) may be a second codebook.

For the PDSCH A and the PDSCH B, different resource allocation tables configured with higher layer signaling may be applied. For example, for the resource allocation of the PDSCH A, higher layer signaling pdsch-TimeDomainAllocationList may be applied. For the resource allocation of the PDSCH B, higher layer signaling pdsch-TimeDomainAllocationList 2 may be applied. In other words, in a case that the resource allocation of a certain PDSCH is given based on the higher layer signaling pdsch-TimeDomainAllocationList, the PDSCH may be the PDSCH A. In a case that the resource allocation of a certain PDSCH is given based on the higher layer signaling pdsch-TimeDomainAllocationList 2, the PDSCH may be the PDSCH B. The codebook corresponding to the PDSCH A may be the first codebook. The codebook corresponding to the PDSCH B may be the second codebook.

The PDSCH A and the PDSCH B may be PDSCHs allocated with different sps-config. The PDSCH allocated with sps-config may be referred to as an SPS PDSCH. The Semi-Persistent (SPS) PDSCH is resources of a PDSCH being periodically allocated. sps-config may be used for configuring downlink semi-persistent transmission for the terminal apparatus. The base station apparatus 3 may configure zero, one, or multiple downlink semi-persistent transmissions (SPS configurations) for the terminal apparatus 1. sps-config may include a part or all of parameters of at least mcs-Table, nrofHARQ-Processes, periodicity, n1PUCCH-AN, spsIndex, and additionalCodebook-sps. mcs-Table may be used for indicating an MCS table applied to reception of the SPS PDSCH. nrofHARQ-Processes may be the number of HARQ process numbers corresponding to SPS PDSCH reception. periodicity may be used for indicating the period of the SPS PDSCH. spsIndex is an identifier of the sps-config, and may be an index indicating the sps-config. n1PUCCH-AN may be used for indicating HARQ-ACK PUCCH resources for the SPS PDSCH. additionalCodebook-sps may be used for indicating the codebook with which the HARQ-ACK corresponding to the SPS PDSCH is associated.

For example, in a case that additionalCodebook-sps is configured for certain sps-config, the HARQ-ACK corresponding to SPS PDSCH reception given based on the sps-config may be associated with the second HARQ-ACK codebook. In other words, in this case, SPS PDSCH reception corresponding to the sps-config may be the PDSCH B. Further, for example, in a case that additionalCodebook-sps is not configured for certain sps-config, the HARQ-ACK corresponding to SPS PDSCH reception given based on the sps-config may be associated with the first HARQ-ACK codebook. In other words, in this case, SPS PDSCH reception corresponding to the sps-config may be the PDSCH A.

Further, additionalCodebook-sps included in sps-config may indicate the HARQ-ACK codebook associated with the HARQ-ACK for corresponding SPS PDSCH reception. For example, in a case that additionalCodebook-sps indicates the first HARQ-ACK codebook, the HARQ-ACK for corresponding SPS PDSCH reception may be associated with the first HARQ-ACK codebook. In other words, the SPS PDSCH reception may be the PDSCH A. Further, for example, in a case that additionalCodebook-sps indicates the second HARQ-ACK codebook, the HARQ-ACK for corresponding SPS PDSCH reception may be associated with the second HARQ-ACK codebook. In other words, the SPS PDSCH reception may be the PDSCH B. In other words, additionalCodebook-sps may indicate whether the SPS PDSCH is the PDSCH A or the PDSCH B. In a case that additionalCodebook-sps indicates that the SPS PDSCH is the PDSCH A, the HARQ-ACK for corresponding SPS PDSCH reception may be associated with the first HARQ-ACK codebook. Further, in a case that additionalCodebook-sps indicates that the SPS PDSCH is the PDSCH B, the HARQ-ACK for corresponding SPS PDSCH reception may be associated with the second HARQ-ACK codebook.

Further, based on periodicity included in sps-config, the terminal apparatus 1 may determine the HARQ-ACK codebook associated with the HARQ-ACK for SPS PDSCH reception corresponding to the sps-config. For example, in a case that periodicity is larger than a prescribed value, the terminal apparatus 1 may determine that the HARQ-ACK for SPS PDSCH reception corresponding to the sps-config is associated with the first HARQ-ACK codebook. In other words, in this case, the SPS PDSCH may be the PDSCH A. In a case that periodicity is equal to the prescribed value or is smaller than the prescribed value, the terminal apparatus 1 may determine that the HARQ-ACK for SPS PDSCH reception corresponding to the sps-config is associated with the second HARQ-ACK codebook. In other words, in this case, the SPS PDSCH may be the PDSCH B. Here, the prescribed value may be 10 ms. The prescribed value may be 1 ms. The prescribed value may be one slot. The prescribed value may be 0.5 slots. The prescribed value may be 0.5 ms. The prescribed value may be a prescribed number of symbols. For example, the predetermined number of symbols may be 2, may be 7, or may be 14.

Further, the base station apparatus 3 may configure higher layer signaling sps-config-urllc different from the higher layer signaling sps-config for the terminal apparatus 1. sps-config-urllc may include parameters the same as the parameters included in sps-config. The HARQ-ACK for SPS PDSCH reception corresponding to sps-config may be associated with the first HARQ-ACK codebook. In other words, the SPS PDSCH allocated with sps-config may be the PDSCH A. The HARQ-ACK for SPS PDSCH reception corresponding to sps-config-urllc may be associated with the second HARQ-ACK codebook. The SPS PDSCH allocated with sps-config-urllc may be the PDSCH B. Here, periodicity included in sps-config may indicate 10 ms or a value larger than 10 ms. periodicity included in sps-config need not indicate a value smaller than 10 ms. periodicity included in sps-config-urllc may indicate a value smaller than 10 ms. Further, periodicity included in sps-config-urllc need not indicate 10 ms or a value larger than 10 ms.

The base station apparatus 3 may transmit zero, one, or multiple higher layer signalings sps-config (and/or, sps-config-urllc) to the terminal apparatus 1. The base station apparatus 3 may transmit a DCI format including a prescribed field set to a prescribed value to the terminal apparatus in order to activate or deactivate certain semi-persistent transmission. In a case that a certain DCI format is a DCI format to which a CRC scrambled with the CS-RNTI is added, and an NDI field included in the DCI format (to be specific, an NDI field for valid transport blocks) is set to 0, the terminal apparatus 1 may verify the DCI format. The terminal apparatus 1 may verify whether or not fields of multiple pieces of information include in the DCI format are set to specific values. In a case that, in the DCI format, all of the fields of information related to the HARQ process number (HARQ process number) are set to '0', and the field of information related to redundancy version (Redundancy version) is set to '00', the terminal apparatus 1 may consider that verification of the DCI format is fulfilled (is successful). In other words, in this case, the DCI format may be used for activation of semi-persistent transmission (semi-persistent scheduling). Further, in a case that, in the DCI format, all of the fields of information related to the HARQ process number (HARQ process number) are set to '0', the field of information related to redundancy version (Redundancy version) is set to '00', all of the fields of information related to the MCS and a coding scheme (Modulation and coding scheme) are set to '1', and all of the fields of information related to frequency domain resource allocation (Frequency domain resource assignment) are set to '1', the terminal apparatus 1 may consider that verification of the DCI format is fulfilled (is successful). In other words, in this case, the DCI format may be used for deactivating semi-persistent transmission (semi-persistent scheduling). The DCI format may be referred to as SPS PDSCH release.

The DCI format used for activation or deactivation of semi-persistent scheduling may include a field indicating an index for identifying the SPS configuration. The terminal apparatus 1 may select one out of multiple configured SPS configurations based on an identifier of sps-config indicated in the field, and then perform activation or deactivation for the selected SPS configuration.

Further, the DCI format used for activation or deactivation of semi-persistent scheduling may include a first field indicating information indicating the HARQ-ACK codebook. The terminal apparatus 1 may associate the HARQ-ACK for the SPS PDSCH or the SPS PDSCH release scheduled using the DCI format with the HARQ-ACK codebook indicated in the first field. In a case that the field indicates the first HARQ-ACK codebook, the HARQ-ACK for the SPS PDSCH or the SPS PDSCH release may be associated with the first HARQ-ACK codebook by using the DCI format. In other words, the SPS PDSCH or the SPS PDSCH release may correspond to the PDSCH A. Further, in a case that the field indicates the second HARQ-ACK codebook, the HARQ-ACK for the SPS PDSCH or the SPS PDSCH release may be associated with the second HARQ-ACK codebook by using the DCI format. In other words, the SPS PDSCH or the SPS PDSCH release may correspond to the PDSCH A.

In a case that the DCI format used for activation or deactivation of semi-persistent scheduling is the DCI A, the HARQ-ACK for the SPS PDSCH or the SPS PDSCH release may be associated with the first HARQ-ACK codebook. In other words, the SPS PDSCH or the SPS PDSCH release may correspond to the PDSCH A. Further, in a case that the DCI format used for activation or deactivation of semi-persistent scheduling is the DCI B, the HARQ-ACK for the SPS PDSCH or the SPS PDSCH release may be associated with the second HARQ-ACK codebook. In other words, the SPS PDSCH or the SPS PDSCH release may correspond to the PDSCH B.

Further, in a case that the DCI format used for activation or deactivation of semi-persistent scheduling is the DCI A, and the CRC of the DCI format is an RNTI A, the HARQ-ACK for the SPS PDSCH or the SPS PDSCH release may be associated with the first HARQ-ACK codebook. In other words, the SPS PDSCH or the SPS PDSCH release may correspond to the PDSCH A. Further, in a case that the DCI format used for activation or deactivation of semi-persistent scheduling is the DCI A, and the CRC of the DCI format is an RNTI B, the HARQ-ACK for the SPS PDSCH or the SPS PDSCH release may be associated with the second HARQ-ACK codebook. In other words, the SPS PDSCH or the SPS PDSCH release may correspond to the PDSCH B. Here, the RNTI A may be the CS-RNTI. The RNTI B may be an RNTI other than the CS-RNTI. The RNTI A and the RNTI B may be used at least for activation or deactivation of semi-persistent scheduling.

Further, the terminal apparatus 1 may transmit the HARQ-ACK for the SPS PDSCH release to the base station apparatus 3. The HARQ-ACK for the SPS PDSCH release may be associated with the HARQ-ACK codebook associated with the HARQ-ACK for the SPS PDSCH.

The resource allocation table configured by the higher layer RRC signaling may be given by higher layer signaling (which may be an information element or an RRC parameter) different from the higher layer signaling pdsch-TimeDomainAllocationList. For example, the resource allocation table configured by the higher layer RRC signaling may be given by higher layer signaling pdsch-TimeDomainAllocationList2. The base station apparatus 3 may use the higher layer signaling to notify pdsch-TimeDomainAllocationList and/or pdsch-TimeDomainAllocationList2. The terminal apparatus 1 may use the higher layer signaling to receive pdsch-TimeDomainAllocationList and/or pdsch-TimeDomainAllocationList2.

Like pdsch-TimeDomainAllocationList, pdsch-TimeDomainAllocationList2 may include up to 16 entries, and any one of the entries may be used by the 4-bit field included in the DCI. The entries included in pdsch-TimeDomainAllocationList2 may indicate $K_0$, mappingType, and/or startSymbolAndLength. Values available for $K_0$, mappingType, and/or startSymbolAndLength in the entries in pdsch-TimeDomainAllocationList2 may differ from values available in pdsch-TimeDomainAllocationList. For example, the value of $K_0$ available in pdsch-TimeDomainAllocationList may range from 0 to 32, and the value of $K_0$ available in pdsch-TimeDomainAllocationList2 may range from 0 to 4. For example, mappingType available in pdsch-TimeDomainAllocationList may include mapping type A and mapping type B, and mappingType available in pdsch-TimeDomainAllocationList2 may include only mapping type B. For example, pdsch-TimeDomainAllocationList2 need not indicate mappingType.

Each entry included in pdsch-TimeDomainAllocationList2 may include information related to the HARQ-ACK codebook. In other words, the HARQ-ACK for the PDSCH given for a certain entry may be associated with the HARQ-ACK codebook indicated in the entry. In a case that the HARQ-ACK codebook indicated in the entry is the first HARQ-ACK codebook, the terminal apparatus 1 may associate the HARQ-ACK for the PDSCH given for the entry with the first HARQ-ACK codebook. Further, in a case that the HARQ-ACK codebook indicated in the entry is the second HARQ-ACK codebook, the terminal apparatus 1 may associate the HARQ-ACK for the PDSCH given for the entry with the second HARQ-ACK codebook.

In a case that the higher layer signaling pdsch-Config includes pdsch-TimeDomainAllocationList and that the PDSCH is scheduled by the DCI A, the terminal apparatus 1 may apply, to the resource allocation table for the PDSCH (PDSCH A), pdsch-TimeDomainAllocationList included in pdsch-Config. In a case that the higher layer signaling pdsch-Config includes pdsch-TimeDomainAllocationList2 and that the PDSCH is scheduled by the DCI B, the terminal apparatus 1 may apply, to the resource allocation table for the PDSCH (PDSCH B), pdsch-TimeDomainAllocationList2 included in pdsch-Config.

In a case that the higher layer signaling pdsch-Config and pdsch-ConfigCommon do not include pdsch-TimeDomainAllocationList and that the PDSCH is scheduled by the DCI A, the terminal apparatus 1 may apply the default table A to the resource allocation table for the PDSCH. In a case that the higher layer signaling pdsch-Config and pdsch-ConfigCommon do not include pdsch-TimeDomainAllocationList2 and that the PDSCH is scheduled by the DCI B, the terminal apparatus 1 may apply the default table D to the resource allocation table for the PDSCH. In a case that pdsch-TimeDomainAllocationList and/or pdsch-TimeDomainAllocationList2 is not configured in the higher layer signaling, the terminal apparatus 1 may use different default tables for the DCI A and the DCI B. In a case that pdsch-TimeDomainAllocationList and/or pdsch-TimeDomainAllocationList2 is not configured in the higher layer signaling, the terminal apparatus 1 may use the same default table for the DCI A and the DCI B.

FIG. 16 is a diagram illustrating an example of calculation of the SLIV.

In FIG. 16, 14 is the number of symbols included in one slot. FIG. 16 illustrates an example of calculation of the SLIV for the Normal Cyclic Prefix (NCP). The value of the SLIV is calculated based on the number of symbols included in the slot, the starting symbol S, and the number L of continuous symbols. Here, the value of L is equal to or greater than 1 and does not exceed (14−S). In a case of calculation of the SLIV for the ECP, instead of values 7 and 14 in FIG. 16, 6 and 12 are used.

The slot offset $K_0$ will be described below.

As described above, at the subcarrier spacing configuration μ, the slots are counted in ascending order from 0 to $N^{subframe,\mu}_{slot}-1$ within the subframe, and counted in ascending order from 0 to $N^{frame,\mu}_{slot}-1$ within the frame. $K_0$ is the number of slots based on the subcarrier spacing of the PDSCH. $K_0$ may take a value ranging from 0 to 32. In a certain subframe or frame, the number of the slots is counted in ascending order from 0. Slot number n with a subcarrier spacing configuration of 15 kHz corresponds to slot numbers 2n and 2n+1 with a subcarrier spacing configuration of 30 kHz.

In a case that the terminal apparatus 1 detects DCI scheduling the PDSCH, the slot assigned to the PDSCH is given by floor $(n*2\mu^{PDSCH}/2\mu^{PDCCH})+K_0$. The function floor(A) outputs a maximum integer that does not exceed A. n is the slot in which a PDCCH that schedules the PDSCH is detected. $\mu_{PDSCH}$ is a subcarrier spacing configuration for the PDSCH. $\mu_{PDCCH}$ is a subcarrier spacing configuration for the PDCCH.

As illustrated in FIG. 10, the terminal apparatus 1 may determine, based on multiple elements, a resource allocation table to be applied to the PDSCH time domain resource allocation. The terminal apparatus 1 may determine, at least based on some or all of elements (A) to (F) described below, the resource allocation table to be applied to the PDSCH scheduled by the DCI.

Element (A): the type of the RNTI that scrambles the CRC to be added to the DCI
Element (B): the type of the search space in which the DCI is detected
Element (C): whether the CORESET associated with the search space is CORESET #0
Element (D): whether pdsch-ConfigCommon includes pdsch-TimeDomainAllocationList
Element (E): whether pdsch-Config includes pdsch-TimeDomainAllocationList
Element (F): SS/PBCH and CORESET multiplexing pattern For the element (A), the type of the RNTI that scrambles the CRC added to the DCI is one of the SI-RNTI, the RA-RNTI, the TC-RNTI, the P-RNTI, the C-RNTI, the MCS-C-RNTI, and the CS-RNTI.

For the element (B), the type of the search space in which the DCI is detected is the common search space or the UE-specific search space. The common search space includes a Type0 common search space, a Type1 common search space, and a Type2 common search space.

In Example A, the terminal apparatus 1 may detect the DCI in any common search space associated with CORESET #0. The CRC scrambled with one of the C-RNTI, the MCS-C-RNTI, and the CS-RNTI is added to the detected DCI. The terminal apparatus 1 may determine a resource allocation table to be applied to the PDSCH scheduled by the DCI. In a case that pdsch-ConfigCommon includes pdsch-TimeDomainAllocationList for the terminal apparatus 1, the terminal apparatus 1 may determine a resource allocation table configured from the higher layer RRC signaling. The resource allocation table is given by pdsch-TimeDomainAllocationList included in pdsch-ConfigCommon. In a case that pdsch-ConfigCommon does not include pdsch-TimeDomainAllocationList for the terminal apparatus 1, the terminal apparatus 1 may determine the default table A. In other words, the terminal apparatus 1 may use and apply, to the determination of the PDSCH time domain resource allocation, the default table A indicating the PDSCH time domain resource allocation configuration.

In Example B, the terminal apparatus 1 may detect the DCI in any common search space not associated with CORESET #0. The detected DCI is provided with the CRC scrambled with one of the C-RNTI, the MCS-C-RNTI, and the CS-RNTI. The terminal apparatus 1 may determine a resource allocation table to be applied to the PDSCH scheduled by the DCI. In a case that pdsch-Config includes pdsch-TimeDomainAllocationList for the terminal apparatus 1, the terminal apparatus 1 may determine a resource allocation table given from pdsch-TimeDomainAllocationList provided by pdsch-Config to be a resource allocation table to be applied to the PDSCH time domain resource allocation. In other words, in a case that pdsch-Config includes pdsch-TimeDomainAllocationList, the terminal apparatus 1 may use and apply pdsch-TimeDomainAllocationList provided by using pdsch-Config, to the determination of the PDSCH time domain resource allocation regardless of whether pdsch-ConfigCommon includes pdsch-TimeDomainAllocationList. Additionally, in a case that pdsch-Config does not include pdsch-TimeDomainAllocationList and pdsch-ConfigCommon includes pdsch-TimeDomainAllocationList, the terminal apparatus 1 may determine a resource allocation table given from pdsch-TimeDomainAllocationList provided by pdsch-ConfigCommon to be a resource allocation table to be applied to the PDSCH time domain resource allocation. In other words, the terminal apparatus 1 uses and applies, to the determination of the PDSCH time domain resource allocation, pdsch-TimeDomainAllocationList provided by using pdsch-ConfigCommon. Additionally, in a case that pdsch-Config does not include pdsch-TimeDomainAllocationList and pdsch-ConfigCommon does not include pdsch-TimeDomainAllocationList, the terminal apparatus 1 may determine the default table A to be a resource allocation table to be applied to the PDSCH time domain resource allocation.

In Example C, the terminal apparatus 1 may detect the DCI in the UE-specific search space. The detected DCI is provided with the CRC scrambled with one of the C-RNTI, the MCS-C-RNTI, and the CS-RNTI. The terminal apparatus 1 may determine a resource allocation table to be applied to the PDSCH scheduled by the DCI. In a case that pdsch-Config includes pdsch-TimeDomainAllocationList for the terminal apparatus 1, the terminal apparatus 1 may determine a resource allocation table given from pdsch-TimeDomainAllocationList provided by pdsch-Config to be a resource allocation table to be applied to the PDSCH time domain resource allocation. In other words, in a case that pdsch-Config includes pdsch-TimeDomainAllocationList, the terminal apparatus 1 may use and apply pdsch-TimeDomainAllocationList provided by using pdsch-Config, to the determination of the PDSCH time domain resource allocation regardless of whether pdsch-ConfigCommon includes pdsch-TimeDomainAllocationList. Additionally, in a case that pdsch-Config does not include pdsch-TimeDomainAllocationList and pdsch-ConfigCommon includes pdsch-TimeDomainAllocationList, the terminal apparatus 1 may determine a resource allocation table given from pdsch-TimeDomainAllocationList provided by pdsch-ConfigCommon to be a resource allocation table to be applied to the PDSCH time domain resource allocation. In other words, the terminal apparatus 1 uses and applies, to the determination of the PDSCH time domain resource allocation, pdsch-TimeDomainAllocationList provided by using pdsch-ConfigCommon. Additionally, in a case that pdsch-Config does not include pdsch-TimeDomainAllocationList and pdsch-ConfigCommon does not include pdsch-TimeDomainAllocationList, the terminal apparatus 1 may determine the default table A to be a resource allocation table to be applied to the PDSCH time domain resource allocation.

A comparison between Example B and Example C indicates that the method for determining the resource allocation table to be applied to the PDSCH detected in the UE-specific search space is similar to a method for determining a resource allocation table to be applied to a PDSCH detected in any common search space not associated with CORESET #0.

FIG. 11 is an example of a table indicating a method for determining a resource allocation table to be applied to the PDSCH according to the present embodiment. The terminal apparatus 1 may determine, in the last row in FIG. 10 (in a case that the DCI is detected in any common search space or UE-specific search space not associated with CORESET #0 and that the RNTI is of a prescribed type), the resource allocation cable as illustrated in FIG. 11. The terminal apparatus 1 may determine the resource allocation table to be applied to the PDSCH scheduled by the DCI, at least based on some of elements (G) to (I) described below in addition to some or all of the elements (A) to (F).

Element (G): whether the DCI is the DCI A (1st DCI) or the DCI B (2nd DCI) described above Element (H): whether pdsch-ConfigCommon includes pdsch-TimeDomainAllocationList2

Element (I): whether pdsch-Config includes pdsch-TimeDomainAllocationList2

However, the same default table (e.g., the default table A) may be used for the case of the DCI A and the case of the DCI B. In addition, pdsch-TimeDomainAllocationList2 may be a parameter that is not included in pdsch-ConfigCommon but that is included only in pdsch-Config.

In the table illustrated in FIG. 11, the terminal apparatus 1 and/or the base station apparatus 3 may determine the resource allocation table applied to the PDSCH, based on the elements (A) to (I) to be one of the default table A, the default table D, pdsch-TimeDomainAllocationList included in pdsch-ConfigCommon, pdsch-TimeDomainAllocationList included in pdsch-Config, pdsch-TimeDomainAllocationList2 included in pdsch-ConfigCommon, and pdsch-TimeDomainAllocationList2 included in pdsch-Config. FIG. 12 is another example of the table indicating the method for determining the resource allocation table to be applied to the PDSCH according to the present embodiment. In the table illustrated in FIG. 12, the terminal apparatus 1 and/or the base station apparatus 3 may determine the resource allocation table applied to the PDSCH, based on the elements (A) to (G) and the element (I) to be one of the default table A, pdsch-TimeDomainAllocationList included in pdsch-ConfigCommon, pdsch-TimeDomainAllocationList included in pdsch-Config, pdsch-TimeDomainAllocationList2 included in pdsch-Config. In the example of the table illustrated in FIG. 12, in a case that the DCI is the DCI B and that pdsch-TimeDomainAllocationList2 is not included in pdsch-Config and pdsch-TimeDomainAllocationList is included in pdsch-ConfigCommon, the resource allocation table applied to the PDSCH is pdsch-TimeDomainAllocationList included in pdsch-ConfigCommon. However, in a case that the DCI is the DCI B and that pdsch-TimeDomainAllocationList2 is not included in pdsch-Config, the resource allocation table applied to the PDSCH may be the default table A or the default table D.

Next, the terminal apparatus 1 may select one PDSCH time domain resource allocation configuration in the determined resource allocation table, based on the value indicated in the 'Time domain resource assignment' field included in the DCI scheduling the corresponding PDSCH. For example, in a case that the resource allocation table applied to the PDSCH time domain resource allocation is the default table A, a value m indicated in the 'Time domain resource assignment' field may indicate a row index m+1 in the default table A. At this time, the PDSCH time domain resource allocation is a time domain resource allocation configuration indicated by the row index m+1. The terminal apparatus 1 assumes the time domain resource allocation configuration indicated by the row index m+1, and receives the PDSCH. For example, in a case that the value m indicated in the 'Time domain resource assignment' field is 0, the terminal apparatus 1 uses a PDSCH time domain resource allocation configuration with the row index 1 in the default table A to identify the resource allocation in the time direction for the PDSCH scheduled by the corresponding DCI.

In a case that the resource allocation table applied to the PDSCH time domain resource allocation is a resource allocation table given from pdsch-TimeDomainAllocationList, the value m indicated in the 'Time domain resource assignment' field corresponds to the (m+1)th element (entry, row) in the list pdsch-TimeDomainAllocationList. For example, in a case that the value m indicated in the 'Time domain resource assignment' field is 0, the terminal apparatus 1 may reference the first element (entry) in the list pdsch-TimeDomainAllocationList. For example, in a case that the value m indicated in the 'Time domain resource assignment' field is 1, the terminal apparatus 1 may reference the second element (entry) in the list pdsch-TimeDomainAllocationList.

Additionally, in a case that the resource allocation table applied to the PDSCH time domain resource allocation is a resource allocation table given from pdsch-TimeDomainAllocationList 2, a value m indicated in the 'Time domain resource assignment' field corresponds to the (m+1)th element (entry or row) in the list pdsch-TimeDomainAllocationList 2. For example, in a case that the value m indicated in the 'Time domain resource assignment' field is 0, the terminal apparatus 1 may reference the first element (entry) in the list pdsch-TimeDomainAllocationList2. For example, in a case that the value m indicated in the 'Time domain resource assignment' field is 1, the terminal apparatus 1 may reference the second element (entry) in the list pdsch-TimeDomainAllocationList2.

Hereinafter, the number of bits (size) of the 'Time domain resource assignment' field included in the DCI will be described.

By detecting the PDCCH including DCI format 1_0, DCI format 1_1, or DCI format 1_2, the terminal apparatus 1 may decode (receive) the corresponding PDSCH. The number of bits in the 'Time domain resource assignment' field in the DCI format 1_0 may be a fixed number. For example, the fixed number of bits may be four. In other words, the size of the 'Time domain resource assignment' field in DCI format 1_0 is four bits. The size of the 'Time domain resource assignment' field included in DCI format 1_1 and DCI format 1_2 may be a variable number of bits. For example, the number of bits in the 'Time domain resource assignment' field included in DCI format 1_1 and DCI format 1_2 may be one of 0, 1, 2, 3, and 4. Further, the number of bits of the 'Time domain resource assignment' field included in DCI format 1_2 may be a value larger than 4.

The determination of the number of bits in the 'Time domain resource assignment' field included in DCI format 1_1 and DCI format 1_2 will be described below.

The number of bits in the 'Time domain resource assignment' field included in DCI format 1_1 and DCI format 1_2 may be given at least based on (I) whether pdsch-ConfigCommon includes pdsch-TimeDomainAllocationList (or pdsch-TimeDomainAllocationList2) and/or (II) whether pdsch-Config includes pdsch-TimeDomainAllocationList (or pdsch-TimeDomainAllocationList2), and/or (III) the number of rows included in the predefined default table. In the present embodiment, a CRC scrambled with one of the C-RNTI, the MCS-C-RNTI, and the CS-RNTI is added to DCI format 1_1 and DCI format 1_2. DCI format 1_1 may be detected in the UE-specific search space. In the present embodiment, the meaning of 'pdsch-Config includes pdsch-TimeDomainAllocationList (or pdsch-TimeDomainAllocationList2)' may be that 'pdsch-TimeDomainAllocationList (or pdsch-TimeDomainAllocationList2) is provided by using pdsch-Config'. The meaning of 'pdsch-ConfigCommon includes pdsch-TimeDomainAllocationList (or pdsch-TimeDomainAllocationList2)' may be that 'pdsch-TimeDomainAllocationList (or pdsch-TimeDomainAllocationList2) is provided by using pdsch-ConfigCommon'.

The number of bits in the 'Time domain resource assignment' field may be given as ceiling ($\log_2$ (I)). A function ceiling (A) outputs a minimum integer not less than A. In a case that pdsch-TimeDomainAllocationList (or pdsch-TimeDomainAllocationList2) is configured (provided) for the terminal apparatus 1, the value of I may be the number of entries included in pdsch-TimeDomainAllocationList (pdsch-TimeDomainAllocationList2). In a case that pdsch-TimeDomainAllocationList (o pdsch-TimeDomainAllocationList2) is not configured (provided) for the terminal apparatus 1, the value of I may be the number of rows in the default table (default table A (or the default table D)). In other words, in a case that pdsch-TimeDomainAllocationList (or pdsch-TimeDomainAllocationList2) is configured for the terminal apparatus 1, the number of bits in the 'Time domain resource assignment' field may be given based on the number of entries included in pdsch-TimeDomainAllocationList (or pdsch-TimeDomainAllocationList2). In a case that pdsch-TimeDomainAllocationList (or pdsch-TimeDomainAllocationList2) is not configured for the terminal apparatus 1, the number of bits in the Time domain resource assignment' field may be given based on the number of rows in the default table (default table A). Specifically, in a case that pdsch-Config includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by using pdsch-Config. Additionally, in a case that pdsch-Config does not include pdsch-TimeDomainAllocationList (or pdsch-TimeDomainAllocationList2) and that pdsch-ConfigCommon includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by using pdsch-ConfigCommon. Additionally, in a case that pdsch-Config does not include pdsch-TimeDomainAllocationList (or pdsch-TimeDomainAllocationList2) and that pdsch-ConfigCommon does not include pdsch-TimeDomainAllocationList (or pdsch-TimeDomainAllocationList2), the value of I may be the number of rows included in the default table (e.g., the default table A or the default table D).

In other words, in a case that pdsch-TimeDomainAllocationList (or pdsch-TimeDomainAllocationList2) is configured (provided) for the terminal apparatus 1, the number of bits in the 'Time domain resource assignment' field may be given as ceiling ($\log_2$ (I)). In a case that pdsch-TimeDomainAllocationList (or pdsch-TimeDomainAllocationList2) is not configured (provided) for the terminal apparatus 1, the number of bits in the 'Time domain resource assignment' field may be a fixed number of bits. For example, the fixed number of bits may be four bits. In this regard, I may be the number of entries included in pdsch-TimeDomainAllocationList (or pdsch-TimeDomainAllocationList2). Specifically, in a case that pdsch-Config includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by using pdsch-Config. Additionally, in a case that pdsch-Config does not include pdsch-TimeDomainAllocationList (or pdsch-TimeDomainAllocationList2) and that pdsch-ConfigCommon includes pdsch-TimeDomainAllocationList (or pdsch-TimeDomainAllocationList2), the value of I may be the number of entries included in pdsch-TimeDomainAllocationList (or pdsch-TimeDomainAllocationList2) provided by using pdsch-ConfigCommon.

Further, the number of entries included in pdsch-TimeDomainAllocationList may be different from the number of entries included in pdsch-TimeDomainAllocationList2. The maximum number of entries included in pdsch-TimeDomainAllocationList may be a first value. For example, the first value is 16. The maximum number of entries included in pdsch-TimeDomainAllocationList2 may be a second value. For example, the first value is a value larger than 16.

Determination (generation) of the HARQ-ACK codebook will be described below.

The terminal apparatus 1 may generate the HARQ-ACK codebook including HARQ-ACK information bits respectively corresponding to one or multiple PDSCHs. The generated HARQ-ACK codebook including HARQ-ACK information bits may be transmitted on the PUCCH. For the terminal apparatus 1, a higher layer parameter pdsch-HARQ-ACK-Codebook is configured to be either 'semi-static' or 'dynamic'. pdsch-HARQ-ACK-Codebook may be used to indicate the type of HARQ-ACK codebook. Here, the type of HARQ-ACK codebook may include a Type-1 HARQ-ACK codebook and a Type-2 HARQ-ACK codebook. In a case that pdsch-HARQ-ACK-Codebook is configured to be 'semi-static' for the terminal apparatus 1, a procedure of Type-1 HARQ-ACK codebook determination may be applied. In a case that pdsch-HARQ-ACK-Codebook is configured to be 'dynamic' for the terminal apparatus 1, a procedure of Type-2 HARQ-ACK codebook determination may be applied. The terminal apparatus 1 may generate the HARQ-ACK codebook, based on the type of HARQ-ACK codebook indicated in pdsch-HARQ-ACK-Codebook.

The terminal apparatus 1 may generate different HARQ-ACK codebooks corresponding to the service type (eMBB, URLLC) of data transmitted on the PDSCH. To be specific, the terminal apparatus 1 may generate the first HARQ-ACK codebook in order to transmit HARQ-ACK information bits corresponding to the PDSCH for transmitting eMBB data. In other words, the first HARQ-ACK codebook may include HARQ-ACK information bits corresponding to the PDSCH for transmitting eMBB data. Further, the terminal apparatus 1 may generate the second HARQ-ACK codebook in order to transmit HARQ-ACK information bits corresponding to the PDSCH for transmitting URLLC data. In other words, the second HARQ-ACK codebook may include HARQ-ACK information bits corresponding to the PDSCH for transmitting URLLC data. The PDSCH for transmitting eMBB data may be the PDSCH A as described above. The PDSCH for transmitting URLLC data may be the PDSCH B as described above.

The base station apparatus 3 may configure higher layer signaling additionalCodebook-urllc for the terminal apparatus 1. The higher layer signaling additionalCodebook-urllc may be used for configuring generation of two HARQ-ACK codebooks for the terminal apparatus 1. In the present embodiment, "higher layer signaling (for example, additionalCodebook-urllc) is configured for the terminal apparatus 1" may mean "the higher layer signaling (for example, additionalCodebook-urllc) is set to 'enabled (Enable)'". Further, "higher layer signaling (for example, additionalCodebook-urllc) is configured for the terminal apparatus 1" may mean "the higher layer signaling (for example, additionalCodebook-urllc) is provided (transmitted)". In other words, in a case that additionalCodebook-urllc is configured for the terminal apparatus 1, the terminal apparatus 1 may generate one or two codebooks. The terminal apparatus 1 may generate the first HARQ-ACK codebook in order to transmit HARQ-ACK information bits corresponding to the PDSCH A. In other words, the HARQ-ACK for the PDSCH A may be associated with the first HARQ-ACK codebook. Further, the terminal apparatus 1 may generate the second HARQ-ACK codebook in order to transmit HARQ-ACK information bits corresponding to the PDSCH B. In other words, the HARQ-ACK for the PDSCH B may be associated with the second HARQ-ACK codebook. In a case that the terminal apparatus 1 generates the first HARQ-ACK codebook, the terminal apparatus 1 may generate the first HARQ-ACK codebook, based on the type of HARQ-ACK codebook indicated in the higher layer signaling pdsch-HARQ-ACK-Codebook. As described above, in a case that pdsch-HARQ-ACK-Codebook is configured to be 'semi-static', the procedure of Type-1 HARQ-ACK codebook determination may be applied to generation of the first HARQ-ACK codebook. In a case that pdsch-HARQ-ACK-Codebook is configured to be 'dynamic', the procedure of Type-2 HARQ-ACK codebook determination may be applied to generation of the first HARQ-ACK codebook. Further, in a case that the terminal apparatus 1 generates the second HARQ-ACK codebook, the terminal apparatus 1 may generate the second HARQ-ACK codebook, based on a predetermined type of HARQ-ACK codebook. For example, the predetermined type of HARQ-ACK codebook may be type 2 (procedure of Type-2 HARQ-ACK codebook determination). In other words, in a case that the terminal apparatus 1 generates the second HARQ-ACK codebook, the terminal apparatus 1 may generate the second HARQ-ACK codebook, using the procedure of Type-2 HARQ-ACK codebook determination. In other words, the procedure of Type-2 HARQ-ACK codebook determination may be applied to generation of the second HARQ-ACK codebook. Further, the predetermined type of HARQ-ACK codebook may be type 1 (procedure of Type-1 HARQ-ACK codebook determination).

Further, the base station apparatus 3 may configure higher layer signaling pdsch-HARQ-ACK-Codebook-urllc for the terminal apparatus 1. The terminal apparatus 1 may generate the second HARQ-ACK codebook, based on the type of HARQ-ACK codebook indicated in the higher layer signaling pdsch-HARQ-ACK-Codebook-urllc. In a case that pdsch-HARQ-ACK-Codebook-urllc is configured to be 'semi-static', the procedure of Type-1 HARQ-ACK codebook determination may be applied to generation of second HARQ-ACK codebook. In a case that pdsch-HARQ-ACK-Codebook-urllc is configured to be 'dynamic', the procedure of Type-2 HARQ-ACK codebook determination may be applied to generation of the second HARQ-ACK codebook.

Further, the base station apparatus 3 need not configure the higher layer signaling additionalCodebook-urllc for the terminal apparatus 1. In the present embodiment, "higher layer signaling (for example, additionalCodebook-urllc) is not configured for the terminal apparatus 1" may mean "the higher layer signaling (for example, additionalCodebook-urllc) is set to 'disabled (Disable)'". "Higher layer signaling (for example, additionalCodebook-urllc) is not configured for the terminal apparatus 1" may mean "the higher layer signaling (for example, additionalCodebook-urllc) is not provided (transmitted)". "Higher layer signaling is not transmitted" may mean "the higher layer signaling is missing (absent) in RRC information transmitted to the terminal apparatus 1". In other words, in a case that additionalCodebook-urllc is not configured for the terminal apparatus 1, the terminal apparatus 1 may generate one codebook. In other words, the terminal apparatus 1 may generate the first HARQ-ACK codebook in order to transmit HARQ-ACK information bits corresponding to the PDSCH B. In other words, the HARQ-ACK for the PDSCH B may be associated with the first HARQ-ACK codebook. In a case that the terminal apparatus 1 generates the first HARQ-ACK codebook, the terminal apparatus 1 may generate the first HARQ-ACK codebook, based on a predetermined type of HARQ-ACK codebook. For example, the predetermined type of HARQ-ACK codebook may be type 2 (procedure of Type-2 HARQ-ACK codebook determination). In other words, in a case that the terminal apparatus 1 generates the first HARQ-ACK codebook, the terminal apparatus 1 may generate the first HARQ-ACK codebook, using the procedure of Type-2 HARQ-ACK codebook determination. In other words, in this case, the procedure of Type-2 HARQ-ACK codebook determination may be applied to generation of the first HARQ-ACK codebook. Further, the predetermined type of HARQ-ACK codebook may be type 1 (procedure of Type-1 HARQ-ACK codebook determination).

Further, the base station apparatus 3 need not configure the higher layer signaling additionalCodebook-urllc for the terminal apparatus 1. In other words, in a case that additionalCodebook-urllc is not configured for the terminal apparatus 1, the terminal apparatus 1 may generate one codebook. In other words, the terminal apparatus 1 may generate the first HARQ-ACK codebook in order to transmit HARQ-ACK information bits corresponding to the PDSCH B. In other words, the HARQ-ACK for the PDSCH B may be associated with the first HARQ-ACK codebook. In a case that the terminal apparatus 1 generates the first HARQ-ACK codebook, the terminal apparatus 1 may generate the first HARQ-ACK codebook, based on the type of HARQ-ACK codebook indicated in the higher layer signaling pdsch-HARQ-ACK-Codebook (or, pdsch-HARQ-ACK-Codebook-urllc). In a case that pdsch-HARQ-ACK-Codebook (or, pdsch-HARQ-ACK-Codebook-urllc) is configured to be 'semi-static', the procedure of Type-1 HARQ-ACK codebook determination may be applied to generation of the first HARQ-ACK codebook. In a case that pdsch-HARQ-ACK-Codebook (or, pdsch-HARQ-ACK-Codebook-urllc) is configured to be 'dynamic', the procedure of Type-2 HARQ-ACK codebook determination may be applied to generation of the first HARQ-ACK codebook.

Further, in a case that additionalCodebook-urllc is not configured for the terminal apparatus 1, the terminal apparatus 1 may generate one codebook. The terminal apparatus 1 may generate the first HARQ-ACK codebook in order to transmit HARQ-ACK information bits corresponding to the PDSCH A and the PDSCH B. In other words, the terminal apparatus 1 may associate both of HARQ-ACK information bits for the PDSCH A and HARQ-ACK information bits for the PDSCH B with the first HARQ-ACK codebook.

The procedure of Type-2 HARQ-ACK codebook determination will be described below.

Figure 8:
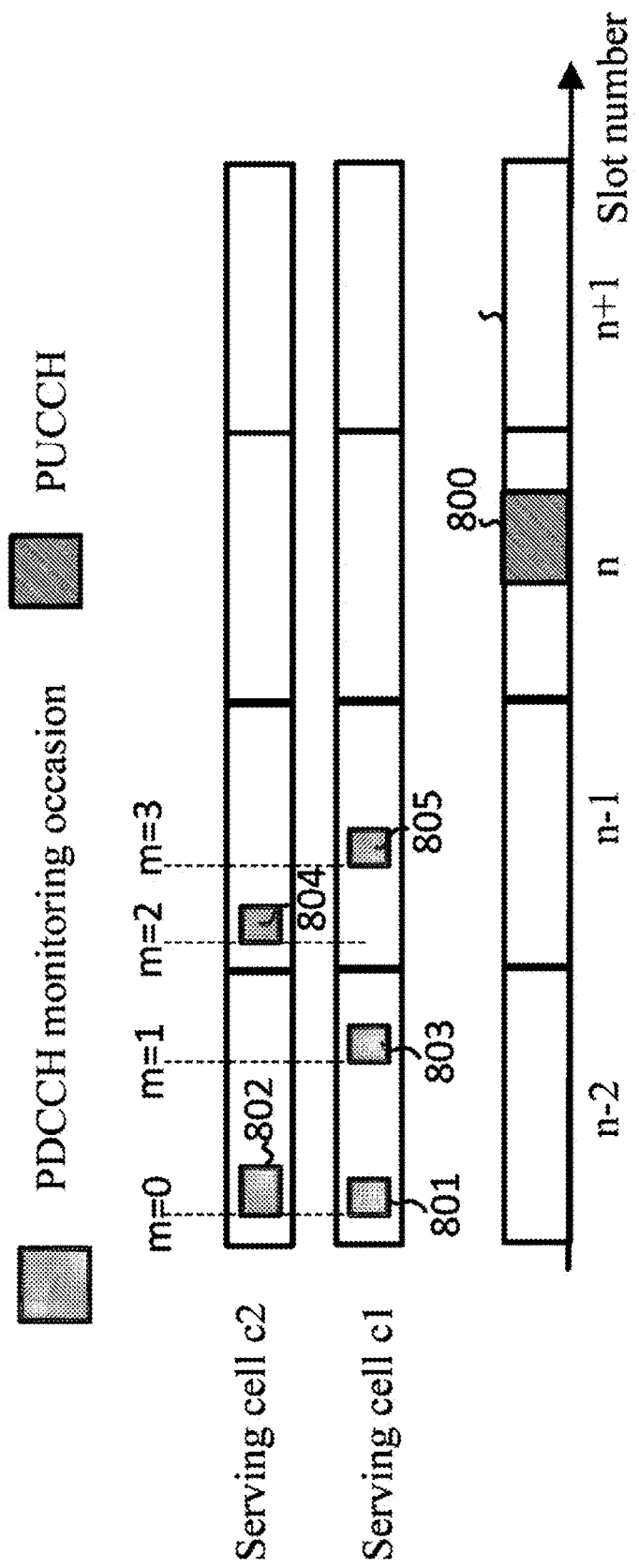
FIG. 8 is a diagram illustrating an example of a procedure of Type-2 HARQ-ACK codebook determination according to an embodiment of the present invention.

In the procedure of Type-2 HARQ-ACK codebook determination, the terminal apparatus 1 may determine Monitoring Occasions for the PDCCH or the SPS PDSCH release including the DCI format for scheduling the PDSCH in an active DL BWP of a serving cell. The terminal apparatus 1 may transmit the HARQ-ACK for the PDSCH or the SPS PDSCH release on the same PUCCH in the slot n. The PDCCH monitoring occasions may be given based at least on a PDSCH-to-HARQ_feedback timing value and a slot offset $K_0$. A PDSCH-to-HARQ_feedback timing value k may be indicated in a PDSCH-to-HARQ-timing-indicator field included in the DCI format for scheduling the PDSCH. For transmission of a second HARQ-ACK code, the PDSCH-to-HARQ_feedback timing value k may be the number of PUCCH sub-slots. For transmission of a first HARQ-ACK code, the PDSCH-to-HARQ_feedback timing value k may be the number of slots (PUCCH slots). For example, in a case that the terminal apparatus 1 receives the PDSCH in the slot n scheduled using the DCI format, the terminal apparatus 1 may transmit the HARQ-ACK for the PDSCH on the PUCCH of slot n+k. Note that, for transmission of the second HARQ-ACK code, the terminal apparatus 1 may transmit the HARQ-ACK for the PDSCH on the PUCCH of a PUCCH sub-slot n+k. The book slot offset $K_0$ may be, as described above, a slot offset between the PDCCH including the DCI and its corresponding PDSCH. The procedure of Type-2 HARQ-ACK codebook determination will be described below with reference to FIG. 8. FIG. 8 is a diagram illustrating an example of the procedure of Type-2 HARQ-ACK codebook determination.

In FIG. 8, two serving cells (serving cell c1, serving cell c2) are configured for the terminal apparatus 1. The terminal apparatus 1 may transmit the PUCCH in the slot n. The terminal apparatus 1 may determine PDCCH monitoring occasions corresponding to PUCCH transmission (800) including the HARQ-ACK in the slot n. A set of PDCCH monitoring occasions for the DCI format for scheduling PDSCH reception or the SPS PDSCH release may be defined as a set of PDCCH monitoring occasions over the active DL BWPs of the configured serving cells, and may be allocated in ascending order of start time of the search space set associated with the PDCCH monitoring occasions. Cardinality of the set of PDCCH monitoring occasions is M. In FIG. 8, the value of M is 4. m is a PDCCH monitoring occasion index. The value of m has a value in the range of from 0 to M−1. In FIG. 8, PDCCH monitoring occasions 801 and 802 are related to PDCCH monitoring occasion index m=0. A PDCCH monitoring occasion 803 is related to PDCCH monitoring occasion index m=1. A PDCCH monitoring occasion 804 is related to PDCCH monitoring occasion index m=2. A PDCCH monitoring occasion 805 is related to PDCCH monitoring occasion index m=3.

The value of a counter Downlink Assignment Indicator (DAI) may indicate a cumulative number of {serving cell, PDCCH monitoring occasion} pairs with the current serving cell and the current PDCCH monitoring occasion. The PDSCH reception or the SPS PDSCH release associated with the DCI format in the {serving cell, PDCCH monitoring occasion} pair exists. The cumulative number of {serving cell, PDCCH monitoring occasion} pairs may be counted (mapped) first in ascending order of the serving cell index and then in ascending order of the PDCCH monitoring occasion index m. In other words, the value of the cumulative number may be accumulated in order of the PDCCH monitoring occasions 801, 802, 803, 804, and 805. The counter DAI may be included in the DCI A or the DCI B. For example, the value of the counter DAI indicated in the DCI format detected in the PDCCH monitoring occasion 804 may indicate the cumulative number of the DCI formats ({serving cell, PDCCH monitoring occasion} pairs) detected before the PDCCH monitoring occasion m=2 in the serving cell c2.

The value of a Total DAI may indicate a total number of {serving cell, PDCCH monitoring occasion} pairs in the current PDCCH monitoring occasion m. The PDSCH reception or the SPS PDSCH release associated with the DCI format in the {serving cell, PDCCH monitoring occasion} pair exists. The total number of {serving cell, PDCCH monitoring occasion} pairs may be updated from the PDCCH monitoring occasions to the PDCCH monitoring occasions. In other words, in the PDCCH monitoring occasions having the same index, the value of the total DAI indicated in the detected DCI format may be the same. The terminal apparatus 1 may determine the value of $O^{ACK}$ transmitted on the PUCCH 800, based at least on the total DAI.

Next, the procedure of Type-1 HARQ-ACK codebook determination will be described.

Figure 9:
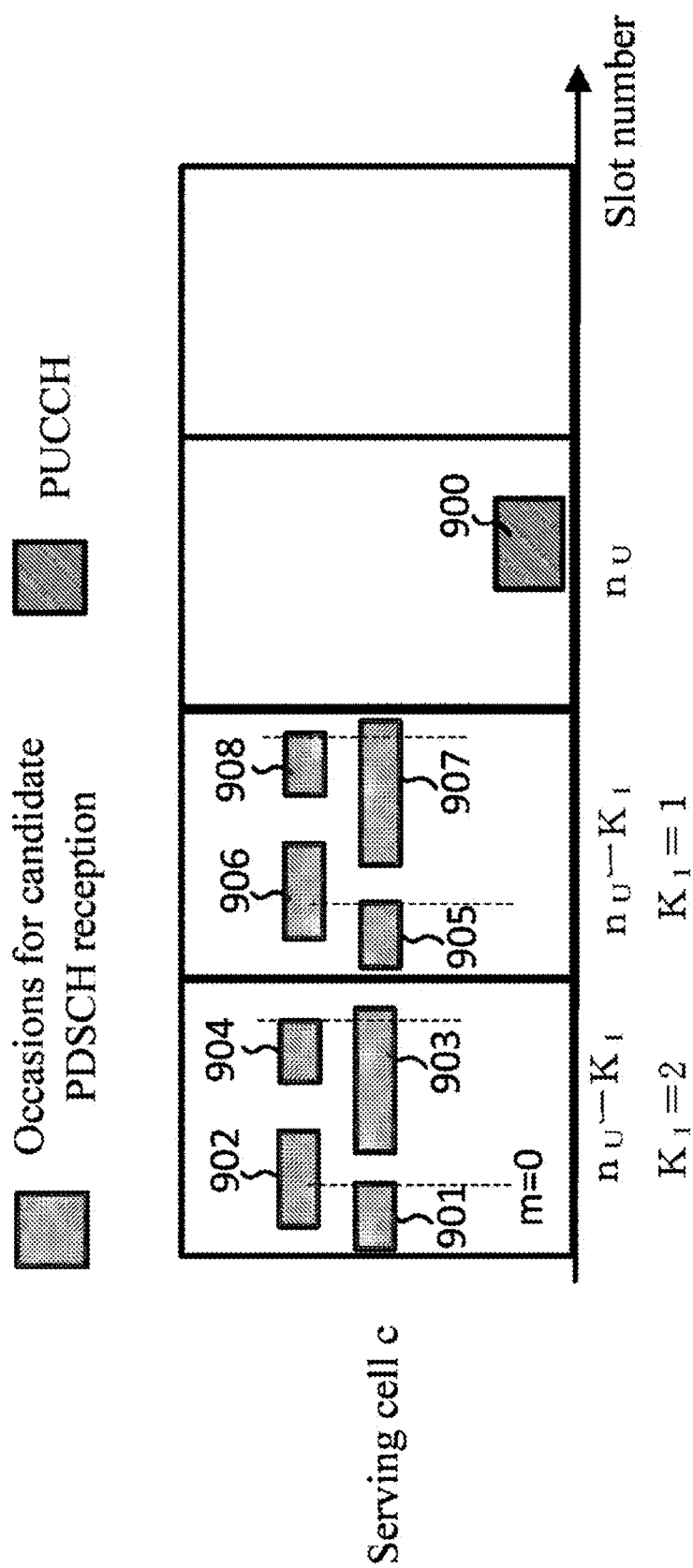
FIG. 9 is a diagram illustrating an example of a procedure of Type-1 HARQ-ACK codebook determination according to an embodiment of the present invention.

In the procedure of Type-1 HARQ-ACK codebook determination, the terminal apparatus 1 may determine a set $M_{A, C}$ of occasions for candidate PDSCH reception related to a PUCCH 900 in the slot n. The HARQ-ACK corresponding to the PDSCH received in the occasions for candidate PDSCH reception may be transmitted on the PUCCH in slot $n_U$. For a certain serving cell c, the terminal apparatus 1 may determine the set $M_{A, C}$ of occasions for candidate PDSCH reception, based at least on a set of slot timing values K1. For transmission of the second HARQ-ACK code, the slot timing value K1 may be the number of PUCCH sub-slots. For transmission of the first HARQ-ACK code, the slot timing value K1 may be the number of slots (PUCCH slots). The set of slot timing values K1 may be given based at least on a slot timing value {1, 2, 3, 4, 5, 6, 7, 8} and/or higher layer signaling dl-DataToUL-ACK. The procedure of Type-1 HARQ-ACK codebook determination will be described below with reference to FIG. 9. FIG. 9 is a diagram illustrating an example of the procedure of Type-1 HARQ-ACK codebook determination.

In FIG. 9, a given set of slot timing values K1 may be {1, 2}. In other words, the terminal apparatus 1 may transmit the HARQ-ACK corresponding to candidate PDSCH reception in slot $n_U-2$ and slot $n_U-1$ on the PUCCH 900 of the slot $n_U$. Note that, for transmission of the second HARQ-ACK code, the terminal apparatus 1 may transmit the HARQ-ACK for the PDSCH on the PUCCH of a PUCCH sub-slot $n_U$. Time domain resource allocation (the starting symbol S and the number L of continuous allocated symbols) for the occasions of candidate PDSCH reception may be given based at least on pdsch-TimeDomainAllocationList as described above. In FIG. 9, 901, 902, 903, and 904 are occasions for candidate PDSCH reception in the slot $n_U-2$. 905, 906, 907, and 908 are occasions for candidate PDSCH reception in the slot $n_U-2$.

The terminal apparatus 1 may include, in a first occasion set, the occasion 901 for candidate PDSCH reception having the smallest index of the ending OFDM symbol out of the occasions {901, 902, 903, 904} for candidate PDSCH reception in the slot $n_U-2$. In a case that the starting symbol index S of the occasions for other candidate PDSCH reception is the same as or smaller than the index of the ending OFDM symbol of the occasion 901 for candidate PDSCH reception, the terminal apparatus 1 may include the occasion for the candidate PDSCH reception in the first occasion set. In other words, the terminal apparatus 1 may include the occasion 902 for candidate PDSCH reception in the first occasion set. Next, the terminal apparatus 1 may include, in a second occasion set, the occasion 904 for candidate PDSCH reception whose index of the ending OFDM symbol is the smallest out of the occasions {903, 904} for candidate PDSCH reception not included in the first occasion set. In a case that the starting symbol index S of the occasions for other candidate PDSCH reception is the same as or smaller than the index of the ending OFDM symbol of the occasion 904 for candidate PDSCH reception, the terminal apparatus 1 may include the occasion for candidate PDSCH reception in the second occasion set. In other words, the terminal apparatus 1 may include the occasion 903 for candidate PDSCH reception in the second occasion set.

Similarly, the terminal apparatus 1 may include, in a third occasion set, the occasion 905 for candidate PDSCH reception whose index of the ending OFDM symbol is the smallest out of the occasions {905, 906, 907, 908} for candidate PDSCH reception in the slot $n_U$–2. In a case that the starting symbol index S of the occasions for other candidate PDSCH reception is the same as or smaller than the index of the ending OFDM symbol of the occasion 905 for candidate PDSCH reception, the terminal apparatus 1 may include the occasion for the candidate PDSCH reception in the third occasion set. In other words, the terminal apparatus 1 may include the occasion 906 for candidate PDSCH reception in the third occasion set. Next, the terminal apparatus 1 may include, in a fourth occasion set, the occasion 908 for candidate PDSCH reception whose index of the ending OFDM symbol is the smallest out of the occasions {907, 908} for candidate PDSCH reception not included in the third occasion set. In a case that the starting symbol index S of the occasions for other candidate PDSCH reception is the same as or smaller than the index of the ending OFDM symbol of the occasion 908 for candidate PDSCH reception, the terminal apparatus 1 may include the occasion for the candidate PDSCH reception in the fourth occasion set. In other words, in FIG. 9, for the serving cell c, cardinality of the set $M_{A,\ C}$ of occasions for candidate PDSCH reception is 4. The terminal apparatus 1 may generate the HARQ-ACK corresponding to each of the occasion sets. The terminal apparatus 1 may determine the value of $O^{ACK}$ transmitted on the PUCCH 900, based at least on the determined set $M_{A,\ C}$ of occasions for candidate PDSCH reception.

Configurations of apparatuses according to the present embodiment will be described below.

Figure 17:
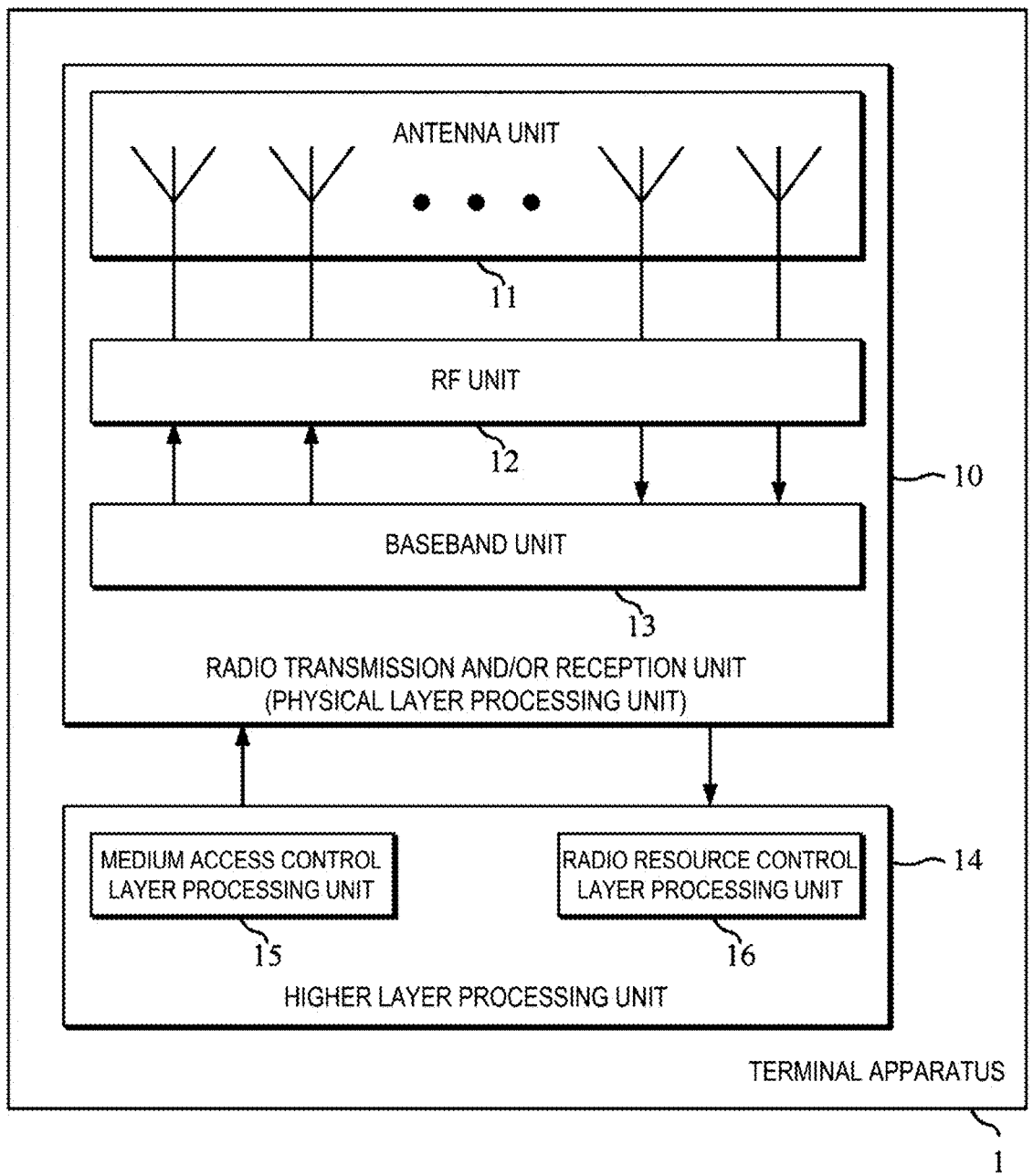
FIG. 17 is a schematic block diagram illustrating a configuration of a terminal apparatus 1 according to an embodiment of the present invention.

FIG. 17 is a schematic block diagram illustrating a configuration of the terminal apparatus 1 according to the present embodiment. As illustrated in the figure, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measurement unit 14, a selection unit, 14, a determination unit 14, or a controller 14.

The higher layer processing unit 14 outputs uplink data (that may be referred to as transport block) generated by a user operation or the like, to the radio transmission and/or reception unit 10. The higher layer processing unit 14 performs a part or all of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 may include a function of determining a time parameter for transmitting the physical uplink shared channel, based on the higher layer signaling and/or the downlink control information received from the base station apparatus 3.

The medium access control layer processing unit 15 included in the higher layer processing unit 14 performs processing of the Medium Access Control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer (RRC layer). The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3. The radio resource control layer processing unit 16 controls (identifies) the resource allocation, based on the downlink control information received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and transmits the transmit signal to the base station apparatus 3 or the like. The radio transmission and/or reception unit 10 outputs, to the higher layer processing unit 14, the higher layer signaling (RRC message), DCI, and the like received from the base station apparatus 3. Additionally, the radio transmission and/or reception unit 10 generates and transmits an uplink signal (including a physical uplink control channel and/or a physical uplink shared channel), based on an indication from the higher layer processing unit 14. The radio transmission and/or reception unit 10 may be provided with a function of receiving the physical downlink control channel and/or the physical downlink shared channel. The radio transmission and/or reception unit 10 may include a function of transmitting the physical uplink control channel and/or the physical uplink shared channel. The radio transmission and/or reception unit 10 may include a function of receiving downlink control information on a physical downlink control channel. The radio transmission and/or reception unit 10 may include a function of outputting, to the higher layer processing unit 14, the downlink control information received on the physical downlink control channel.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. Additionally, the RF unit 12 may function of determining transmit power for an uplink signal and/or an uplink channel transmitted in the serving cell. The RF unit 12 is also referred to as a transmit power control unit.

Figure 18:
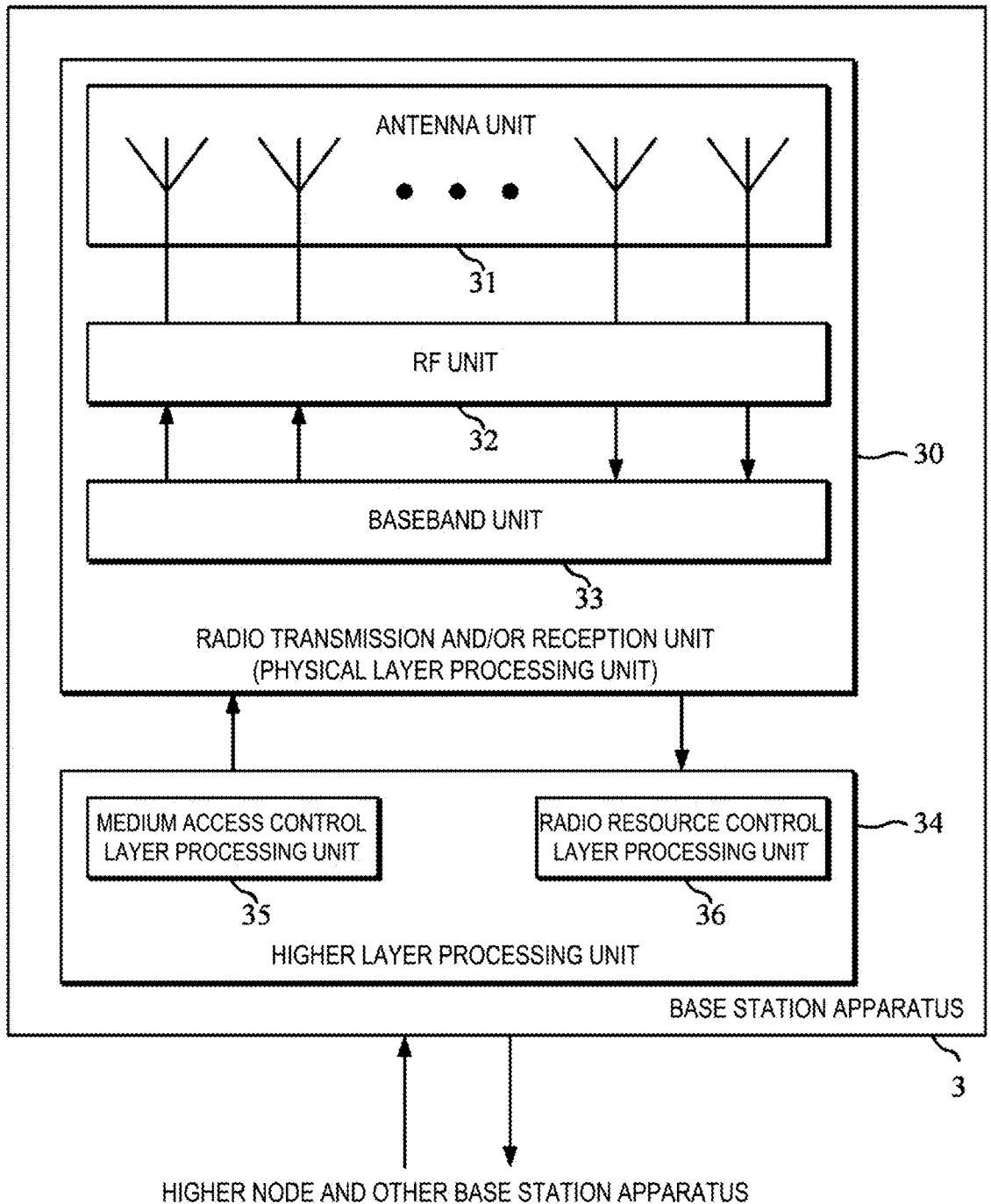
FIG. 18 is a schematic block diagram illustrating a configuration of a base station apparatus 3 according to an embodiment of the present invention.

FIG. 18 is a schematic block diagram illustrating a configuration of the base station apparatus 3 according to the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a monitor unit, or a physical layer processing unit. A controller controlling operations of the units based on various conditions may be separately provided. The higher layer processing unit 34 is also referred to as a determination unit 34 or a control unit 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may include a function of generating downlink control information, based on the time parameter for transmitting the physical uplink shared channel, based on the higher layer signaling transmitted to the terminal apparatus 1. The higher layer processing unit 34 may include a function of outputting the generated downlink control information and the like to the radio transmission and/or reception unit 30.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, for the terminal apparatus 1, downlink control information (uplink grant and downlink grant) including resource allocation information. The radio resource control layer processing unit 36 generates or acquires from a higher node, downlink control information, downlink data (transport block and random access response) mapped to a physical downlink shared channel, system information, an RRC message, a MAC Control Element (CE), and the like, and outputs the generated or acquired data and the like to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters. The radio resource control layer processing unit 36 may transmit/report information for identifying a configuration of one or multiple reference signals in a certain cell.

In a case that the base station apparatus 3 transmits the RRC message, the MAC CE, and/or the PDCCH to the terminal apparatus 1, and the terminal apparatus 1 performs processing, based on the reception, the base station apparatus 3 performs processing (control of the terminal apparatus 1 and the system) assuming that the terminal apparatus is performing the above-described processing. In other words, the base station apparatus 3 sends, to the terminal apparatus 1, the RRC message, MAC CE, and/or PDCCH intended to cause the terminal apparatus to perform the processing based on the reception.

The radio transmission and/or reception unit 30 transmits higher layer signaling (RRC message), DCI, and the like to the terminal apparatus 1. The radio transmission and/or reception unit 30 receives the uplink signal transmitted from the terminal apparatus 1 based on an indication from the higher layer processing unit 34. The radio transmission and/or reception unit 30 may include a function of transmitting the physical downlink control channel and/or the physical downlink shared channel. The radio transmission and/or reception unit 30 may include a function of receiving the physical uplink control channel and/or the physical uplink shared channel. The radio transmission and/or reception unit 30 may include a function of transmitting downlink control information on the physical downlink control channel. The radio transmission and/or reception unit 30 may include a function of transmitting the downlink control information output by the higher layer processing unit 34, on the physical downlink control channel. In addition, some of the functions of the radio transmission and/or reception unit 30 are similar to the corresponding functions of the radio transmission and/or reception unit 10, and thus description of these functions is omitted. Note that in a case that the base station apparatus 3 is connected to one or multiple transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 18, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit or an application layer processing unit reside in the higher layer processing unit 34.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit.

(1) A terminal apparatus 1 according to the first aspect of the present invention includes: a receiver 10 configured to receive a higher layer parameter and a PDSCH; and a transmitter 10 configured to generate a HARQ-ACK codebook, and transmit the generated HARQ-ACK codebook on a PUCCH, wherein in a case that a first parameter is configured, a first HARQ-ACK codebook and a second HARQ-ACK codebook are generated, the first HARQ-ACK codebook is used to transmit a HARQ-ACK bit corresponding to a PDSCH A, and the second HARQ-ACK codebook is used to transmit a HARQ-ACK bit corresponding to a PDSCH B, and in a case that the first parameter is not configured, the first HARQ-ACK codebook is generated, and the first HARQ-ACK codebook is used to transmit the HARQ-ACK bit corresponding to the PDSCH B.

(2) A base station apparatus 3 according to the second aspect of the present invention includes: a transmitter 30 configured to transmit a higher layer parameter and a PDSCH; and a receiver 30 configured to receive a HARQ-ACK codebook on a PUCCH, wherein in a case that a first parameter is configured, a first HARQ-ACK codebook and a second HARQ-ACK codebook are generated, the first HARQ-ACK codebook is used to transmit a HARQ-ACK bit corresponding to a PDSCH A, and the second HARQ-ACK codebook is used to transmit a HARQ-ACK bit corresponding to a PDSCH B, and in a case that the first parameter is not configured, the first HARQ-ACK codebook is generated, and the first HARQ-ACK codebook is used to transmit the HARQ-ACK bit corresponding to the PDSCH B.

(3) In the first aspect or the second aspect of the present invention, in a case that the first parameter is configured, the first HARQ-ACK codebook is generated based on a type of codebook indicated by a higher layer parameter pdsch-HARQ-ACK-Codebook, and the second HARQ-ACK codebook is generated based on a prescribed type.

(4) In the first aspect or the second aspect of the present invention, in a case that the first parameter is configured, the first HARQ-ACK codebook is generated based on a type of codebook indicated by a higher layer parameter pdsch-HARQ-ACK-Codebook, and the second HARQ-ACK codebook is generated based on a type of codebook indicated by a higher layer parameter pdsch-HARQ-ACK-Codebook-Urllc.

(5) In the first aspect or the second aspect of the present invention, in a case that the first parameter is not configured, the first HARQ-ACK codebook is generated based on a prescribed type.

(6) In the first aspect or the second aspect of the present invention, in a case that the first parameter is not configured, the first HARQ-ACK codebook is generated based on a type of codebook indicated by a higher layer parameter pdsch-HARQ-ACK-Codebook-Urllc.

(7) In the first aspect or the second aspect of the present invention, higher layer signaling pdsch-HARQ-ACK-Codebook or pdsch-HARQ-ACK-Codebook-Urllc is used to indicate one of type 1 and type 2, and the prescribed type is the type 2.

(8) In the first aspect or the second aspect of the present invention, in a case that the first parameter is not configured, the first HARQ-ACK codebook is generated based on a prescribed type.

(9) In the first aspect or the second aspect of the present invention, in a case that the first parameter is not configured, both of a HARQ-ACK for the PDSCH A and a HARQ-ACK for the PDSCH B are configured to be associated with the first HARQ-ACK codebook.

(9) In the first aspect or the second aspect of the present invention, the PDSCH A is a PDSCH scheduled using DCI A, the PDSCH B is a PDSCH scheduled using DCI B, a value of an RNTI for scrambling a CRC added to the DCI A is in a first range, and a value of an RNTI for scrambling a CRC added to the DCI B is in a second range different from the first range.

(10) In the first aspect or the second aspect of the present invention, the PDSCH A is a PDSCH scheduled using DCI A, the PDSCH B is a PDSCH scheduled using DCI B, a format used for the DCI A is a first format, and a format used for the DCI B is a second format different from the first format.

With this configuration, the terminal apparatus 1 can efficiently communicate with the base station apparatus 3. For example, for reception of data of different services (eMBB, URLLC), the terminal apparatus 1 can determine transmission of the HARQ-ACK corresponding to different PDSCHs. Further, the base station apparatus 3 can efficiently communicate with the terminal apparatus 1. For example, for transmission of data of different services (eMBB, URLLC), the base station apparatus 3 can determine reception of the HARQ-ACK corresponding to different PDSCHs.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. It may be implemented by causing a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general purpose processor may be a microprocessor or may be a processor, a controller, a micro-controller, or a state machine of known type, instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to an aspect of the present invention, an example has been described in which the present invention is applied to a communication system including a base station apparatus and a terminal apparatus, but the present invention can also be applied in a system in which terminals communicate as in the case of Device to Device (D2D).

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transmission unit (TXRU)
51 Phase shifter
52 Antenna element

The invention claimed is:

1. A terminal apparatus comprising:
reception circuitry configured to receive a Physical Downlink Shared CHannel (PDSCH); and
transmission circuitry configured to generate a Hybrid Automatic Repeat request ACKnowledgement (HARQ-ACK) codebook including a HARQ-ACK bit for the PDSCH, and transmit the generated HARQ-ACK codebook on a Physical Uplink Control CHannel (PUCCH), wherein
in a first case that a first Radio Resource Control (RRC) parameter is provided, a first HARQ-ACK codebook and a second HARQ-ACK codebook are generated, a type of the first HARQ-ACK codebook and a type of the second HARQ-ACK codebook are individually configured, and
in a second case that the first RRC parameter is not provided, one HARQ-ACK codebook is generated.

2. The terminal apparatus according to claim 1, wherein
in the first case, the first HARQ-ACK codebook is associated with a HARQ-ACK for a first PDSCH, the second HARQ-ACK codebook is associated with a HARQ-ACK for a second PDSCH, the first PDSCH is scheduled by a DCI format in which a value of a first field is set to '0', and the second PDSCH is scheduled by a DCI format in which the value of the first field is set to '1'.

3. The terminal apparatus according to claim 1, wherein
one or multiple downlink semi-persistent (SPS) configurations are received, and the one or multiple downlink SPS configurations are used to configure downlink semi-persistent transmission, and
in the first case, a second RRC parameter is included in each of the one or multiple downlink SPS configurations, and the second RRC parameter indicates a HARQ-ACK codebook for SPS PDSCH reception of the downlink SPS configuration including the second RRC parameter.

4. The terminal apparatus according to claim 1, wherein
types of the HARQ-ACK codebook include a Type-1 HARQ-ACK codebook and a Type-2 HARQ-ACK codebook, and in the first case, a type of the first HARQ-ACK codebook is indicated by a third RRC parameter, and a type of the second HARQ-ACK codebook is indicated by a fourth RRC parameter.

5. A base station apparatus for communicating with a terminal apparatus, the base station apparatus comprising:
transmission circuitry configured to transmit a Physical Downlink Shared CHannel (PDSCH); and
reception circuitry configured to receive, on a Physical Uplink Control CHannel (PUCCH), a Hybrid Automatic Repeat request ACKnowledgement (HARQ-ACK) codebook including a HARQ-ACK bit for the PDSCH in the terminal apparatus, wherein
in a first case that a first Radio Resource Control (RRC) parameter is provided for the terminal apparatus, a first HARQ-ACK codebook and a second HARQ-ACK codebook are generated, a type of the first HARQ-ACK codebook and a type of the second HARQ-ACK codebook are individually configured; and
in a second case that the first RRC parameter is not provided for the terminal apparatus, one HARQ-ACK codebook is generated.

6. The base station apparatus according to claim 5, wherein
in the first case, the first HARQ-ACK codebook is associated with a HARQ-ACK for a first PDSCH, the second HARQ-ACK codebook is associated with a HARQ-ACK for a second PDSCH, the first PDSCH is scheduled by a DCI format in which a value of a first field is set to '0', and the second PDSCH is scheduled by a DCI format in which the value of the first field is set to '1'.

7. The base station apparatus according to claim 5, wherein one or multiple downlink semi-persistent (SPS) configurations are transmitted, and the one or multiple downlink SPS configurations are used to configure downlink semi-persistent transmission, and in the first case, a second RRC parameter is included in each of the one or multiple downlink SPS configurations, and the second RRC parameter indicates a HARQ-ACK codebook for SPS PDSCH transmission of the downlink SPS configuration including the second RRC parameter.

8. The base station apparatus according to claim 5, wherein types of the HARQ-ACK codebook include a Type-1 HARQ-ACK codebook and a Type-2 HARQ-ACK codebook, and in the first case, a type of the first HARQ-ACK codebook is indicated by a third RRC parameter, and a type of the second HARQ-ACK codebook is indicated by a fourth RRC parameter.

9. A communication method for a terminal apparatus, the communication method comprising:

receiving a Physical Downlink Shared CHannel (PDSCH); and generating a Hybrid Automatic Repeat request ACKnowledgement (HARQ-ACK) codebook including a HARQ-ACK bit for the PDSCH, and transmitting the generated HARQ-ACK codebook on a Physical Uplink Control CHannel (PUCCH), wherein in a first case that a first Radio Resource Control (RRC) parameter is provided, a first HARQ-ACK codebook and a second HARQ-ACK codebook are generated, a type of the first HARQ-ACK codebook and a type of the second HARQ-ACK codebook are individually configured; and in a second case that the first RRC parameter is not provided, one HARQ-ACK codebook is generated.

* * * * *